United States Patent
Yanai et al.

(10) Patent No.: US 9,057,019 B2
(45) Date of Patent: Jun. 16, 2015

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Takayoshi Yanai, Chiba (JP); Yasuyuki Gotoh, Chiba (JP); Chikahide Kanadani, Chiba (JP); Hiroki Ookawa, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 61 days.

(21) Appl. No.: 14/025,837

(22) Filed: Sep. 13, 2013

(65) Prior Publication Data
US 2014/0084210 A1 Mar. 27, 2014

(30) Foreign Application Priority Data
Sep. 24, 2012 (JP) .................... 2012-209598

(51) Int. Cl.
| | | |
|---|---|---|
| C09K 19/30 | (2006.01) | |
| C09K 19/34 | (2006.01) | |
| C09K 19/12 | (2006.01) | |
| C09K 19/20 | (2006.01) | |
| C09K 19/04 | (2006.01) | |

(52) U.S. Cl.
CPC ......... *C09K 19/3402* (2013.01); *C09K 19/3066* (2013.01); *C09K 19/3068* (2013.01); *C09K 19/20* (2013.01); *C09K 2019/0444* (2013.01); *C09K 2019/0466* (2013.01); *C09K 2019/3021* (2013.01); *C09K 2019/3071* (2013.01); *C09K 2019/3078* (2013.01); *C09K 2019/3422* (2013.01)

(58) Field of Classification Search
CPC ........... C09K 19/3402; C09K 19/3066; C09K 19/3068; C09K 19/20; C09K 19/30; C09K 19/34; C09K 19/12; C09K 2019/0444; C09K 2019/0466; C09K 2019/3021; C09K 2019/3071; C09K 2019/3078; C09K 2019/3422
USPC ............... 252/299.01, 299.6, 299.61, 299.63, 252/299.66; 349/167, 182; 428/1.1
See application file for complete search history.

(56) References Cited

U.S. PATENT DOCUMENTS 8,795,552 B2 * 8/2014 Wu et al. .................. 252/299.61
2014/0034876 A1 * 2/2014 Gotoh et al. ............. 252/299.61

FOREIGN PATENT DOCUMENTS

JP H10-204016 8/1998

\* cited by examiner

*Primary Examiner* — Geraldina Visconti
(74) *Attorney, Agent, or Firm* — Jianq Chyun IP Office

(57) ABSTRACT

A liquid crystal composition is described, which has a nematic phase, contains a specific compound having a high maximum temperature or a large dielectric anisotropy as a first component and a specific compound having a large dielectric anisotropy as a second component, and may also contain a specific compound having a high maximum temperature or a small viscosity as a third component and a specific compound having a high maximum temperature or a large dielectric anisotropy as a fourth component. An active-matrix (AM) liquid crystal display device including the liquid crystal composition is also described.

16 Claims, No Drawings

LIQUID CRYSTAL COMPOSITION AND LIQUID CRYSTAL DISPLAY DEVICE

CROSS-REFERENCE TO RELATED APPLICATION

This application claims the priority benefit of Japan Patent Application No. 2012-209598 filed on Sep. 24, 2012. The entirety of the above-mentioned patent application is hereby incorporated by reference herein and made a part of this specification.

TECHNICAL FIELD

The invention relates to a liquid crystal composition mainly suitable for use in an active matrix (AM) device and so forth, and an AM device and so forth including the composition. In particular, the invention relates to a liquid crystal composition having a positive dielectric anisotropy, and a device that includes the composition and has a mode such as a twisted nematic (TN) mode, an optically compensated bend (OCB) mode, an in-plane switching (IPS) mode, a fringe field switching (FFS) mode, a polymer sustained alignment (PSA) mode or a field-induced photo-reactive alignment (FPA) mode.

BACKGROUND ART

For liquid crystal display devices, a classification based on the operation mode of liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode, a polymer sustained alignment (PSA) mode and a field-induced photo-reactive alignment (FPA) mode. A classification based on the driving mode of the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type according to the production process. A classification based on the light source includes a reflective type utilizing natural light, a transmissive type utilizing backlight and a transflective type utilizing both the natural light and the backlight.

The devices include a liquid crystal composition having suitable characteristics. The liquid crystal composition has a nematic phase. General characteristics of the composition should be improved to obtain an AM device having good general characteristics. Table 1 below summarizes the relationship between the two groups of general characteristics. The general characteristics of the composition will be further explained based on a commercially available AM device. The temperature range of the nematic phase relates to a temperature range in which the device can be used. A preferred maximum temperature of the nematic phase is approximately 70° C. or higher and a preferred minimum temperature of the nematic phase is approximately −10° C. or lower. The viscosity of the composition relates to the response time of the device. A short response time is preferred for displaying moving images on the device. Accordingly, a small viscosity of the composition is preferred. A small viscosity at a low temperature is further preferred. The elastic constant of the composition relates to the contrast of the device. In order to increase the contrast of the device, a large elastic constant of the composition is further preferred.

TABLE 1

General Characteristics of Composition and AM Device

| No. | General Characteristics of Composition | General Characteristics of AM Device |
| --- | --- | --- |
| 1 | Wide temperature range of nematic phase | Wide usable temperature range |
| 2 | Small viscosity [1] | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |
| 7 | Large elastic constant | Large contrast ratio and short response time |

[1] A liquid crystal composition can be injected into a liquid crystal cell in a shorter period of time.

An optical anisotropy of the composition relates to a contrast ratio in the device. A product ($\Delta n \times d$) of the optical anisotropy ($\Delta n$) of the composition and a cell gap (d) in the device is designed so as to maximize the contrast ratio. A suitable value of the product depends on the type of the operation mode. The suitable value is approximately 0.45 micrometer for a device having the TN mode. In the above case, a composition having a large optical anisotropy is preferred for a device having a small cell gap. A large dielectric anisotropy of the composition contributes to a low threshold voltage, a small electric power consumption and a large contrast ratio of the device. Accordingly, a large dielectric anisotropy is preferred. A large specific resistance of the composition contributes to a large voltage holding ratio and a large contrast ratio of the device. Accordingly, a composition having a large specific resistance at room temperature and also at a temperature close to the maximum temperature of the nematic phase in an initial stage is preferred. A composition having a large specific resistance at room temperature and also at a temperature close to the maximum temperature of the nematic phase even after the device has been used for a long period of time is preferred. The stability of the composition to ultraviolet light and heat relates to the service life of the liquid crystal display device. In a case where the stability is high, the device has a long service life. Such characteristics are preferred for an AM device for use in a liquid crystal projector, a liquid crystal television and so forth.

A composition having a positive dielectric anisotropy is used for an AM device having the TN mode. On the other hand, a composition having a negative dielectric anisotropy is used for an AM device having the VA mode. A composition having a positive or negative dielectric anisotropy is used for an AM device having the IPS mode or the FFS mode. A composition having a positive or negative dielectric anisotropy is used for an AM device having the PSA mode. Examples of the liquid crystal composition having a positive dielectric anisotropy are disclosed in the following Patent Literature.

CITATION LIST

Patent Literature

Patent Literature No. 1: JP H10-204016 A.

A desirable AM device has characteristics such as a wide temperature range in which a device can be used, a short response time, a large contrast ratio, a low threshold voltage, a large voltage holding ratio and a long service life. A shorter response time even by one millisecond is desirable. Thus, desirable characteristics of a composition include a high maximum temperature of a nematic phase, a low minimum temperature of the nematic phase, a small viscosity, a suitable optical anisotropy, a large dielectric anisotropy, a large specific resistance, a high stability to ultraviolet light, a high stability to heat and a large elastic constant.

SUMMARY OF INVENTION

Accordingly, the invention provides a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light, a high stability to heat and a large elastic constant. The invention also provides a liquid crystal composition having a suitable balance regarding at least two of the characteristics. The invention further provides a liquid crystal display device including such a composition. The invention additionally provides a composition having a suitable optical anisotropy, a large dielectric anisotropy, a high stability to ultraviolet light, a large elastic constant and so forth, and an AM device having characteristics such as a short response time, a large voltage holding ratio, a large contrast ratio and a long service life.

The liquid crystal composition of the invention has a positive dielectric anisotropy, and contains at least one compound selected from the group of compounds represented by formula (1) as a first component and at least one compound selected from the group of compounds represented by formula (2) as a second component:

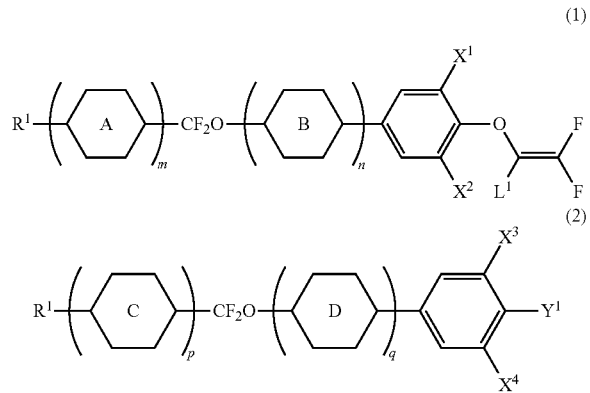

wherein, $R^1$ and $R^2$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine; ring A, ring B, ring C and ring D are independently 1,4-cyclohexylene, 1,4-phenylene, 3-fluoro-1,4-phenylene, 3,5-difluoro-1,4-phenylene, pyrimidine-2,5-diyl, 1,3-dioxane-2,5-diyl or tetrahydropyran-2,5-diyl; $X^1$, $X^2$, $X^3$ and $X^4$ are independently fluorine or chlorine; $L^1$ is hydrogen or fluorine; $Y^1$ is fluorine, chlorine, trifluoromethyl or trifluoromethoxy; m and p are independently 1, 2, or 3, n and q are independently 0, 1 or 2, the sum of m and n and the sum of p and q are 3 or less, and when one of the two rings C in a case where p is 2 is 1,4-cyclohexylene, the other is not 1,4-phenylene.

The invention also concerns a liquid crystal display device including the liquid crystal composition.

The invention further concerns use of the liquid crystal composition in a liquid crystal display device.

An advantage of the invention is a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light and a high stability to heat. One aspect of the invention is a liquid crystal composition having a suitable balance regarding at least two of the characteristics. Another aspect is a liquid crystal display device including such a composition. A further aspect includes a composition having a suitable optical anisotropy, a large dielectric anisotropy, a high stability to ultraviolet light and so forth, and an AM device having characteristics such as a short response time, a large voltage holding ratio, a large contrast ratio and a long service life.

DESCRIPTION OF EMBODIMENTS

The usage of terms herein is described below. A liquid crystal composition or a liquid crystal display device according to the invention may be occasionally abbreviated as "composition" or "device," respectively. The liquid crystal display device is a generic term for a liquid crystal display panel and a liquid crystal display module. "Liquid crystal compound" means a compound having a liquid crystal phase such as a nematic phase or a smectic phase, or a compound having no liquid crystal phase but being useful as a component of the composition. Such a useful compound has a six-membered ring such as 1,4-cyclohexylene and 1,4-phenylene, and a rod-like molecular structure. An optically active compound or a polymerizable compound may be occasionally added to the composition. Even in the case where the compounds are liquid crystalline, the compounds are classified as an additive herein. At least one compound selected from the group of compounds represented by formula (1) may be occasionally abbreviated as "compound (1)." "Compound (1)" means one or two or more compounds represented by formula (1). The same rule applies to any other compound represented by any other formula. "At least one" in the context of "replaced" means that not only the positions but also the numbers may be selected without limitation.

The higher limit of a temperature range of the nematic phase may be occasionally abbreviated as "maximum temperature." The lower limit of the temperature range of the nematic phase may be occasionally abbreviated as "minimum temperature." The expression "having a large specific resistance" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device has been used for a long period of time. The expression "having a large voltage holding ratio" means that the device has a large voltage holding ratio at room temperature and also at a high temperature in an initial stage, and that the device has a large voltage holding ratio at room temperature and also at a temperature close to the maximum temperature of the nematic phase even after the device has been used for a long period of time. When characteristics such as an optical anisotropy are explained, values obtained according to the measuring methods described in Examples will be used. The first component includes one compound or two or more compounds. "Proportion of the first component" is expressed in terms of weight percent (wt %) of the first component based on the total weight of the liquid crystal composition. The proportion of the second component and so forth are also expressed in a similar manner. The proportion of the additive mixed in the composition is expressed in terms of weight percent (wt %) or weight parts per million (ppm) based on the total weight of the liquid crystal composition.

The symbol $R^1$ is used in the chemical formulas of a plurality of component compounds. The functional groups selected for $R^1$ may be identical or different in arbitrary two compounds among the plurality of compounds. In one case, for example, $R^1$ of compound (1) is ethyl and $R^1$ of compound (1-1) is ethyl. In another case, $R^1$ of compound (1) is ethyl and $R^1$ of compound (1-1) is propyl. The same rule also applies to the symbol $R^2$, $X^1$ or $Y^1$, etc.

The invention includes the items described below.

Item 1 is a liquid crystal composition that has a positive dielectric anisotropy, and contains at least one compound selected from the group of compounds represented by formula (1) as a first component and at least one compound selected from the group of compounds represented by formula (2) as a second component:

(1)

(2)

wherein $R^1$ and $R^2$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine; ring A, ring B, ring C and ring D are independently 1,4-cyclohexylene, 1,4-phenylene, 3-fluoro-1,4-phenylene, 3,5-difluoro-1,4-phenylene, pyrimidine-2,5-diyl, 1,3-dioxane-2,5-diyl or tetrahydropyran-2,5-diyl; $X^1$, $X^2$, $X^3$ and $X^4$ are independently fluorine or chlorine; $L^1$ is hydrogen or fluorine; $Y^1$ is fluorine, chlorine, trifluoromethyl or trifluoromethoxy; and m and p are independently 1, 2 or 3, n and q are independently 0, 1 or 2, the sum of m and n and the sum of p and q are 3 or less, and when one of the two rings C in a case where p is 2 is 1,4-cyclohexylene, the other is not 1,4-phenylene.

Item 2 is the liquid crystal composition according to item 1 that contains at least one compound selected from the group of compounds represented by formula (1-1) to formula (1-13) as the first component:

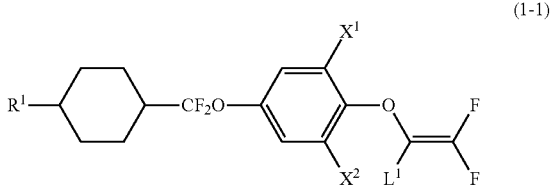 (1-1)

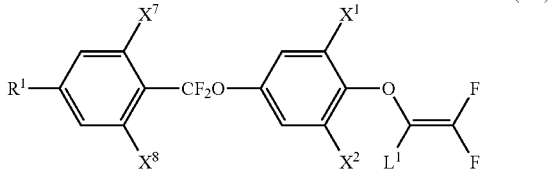 (1-2)

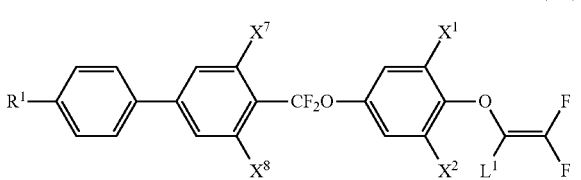 (1-3)

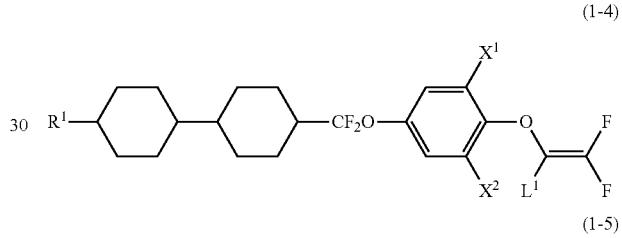 (1-4)

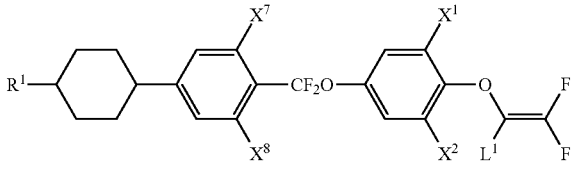 (1-5)

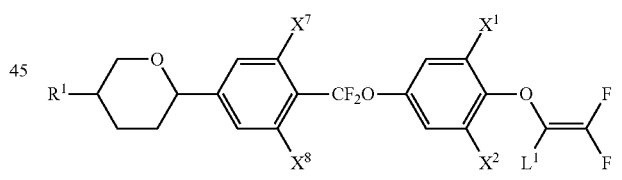 (1-6)

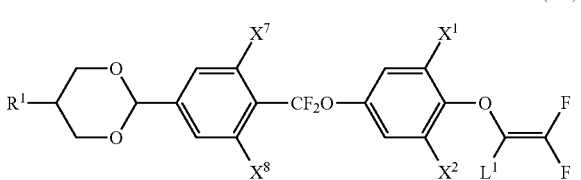 (1-7)

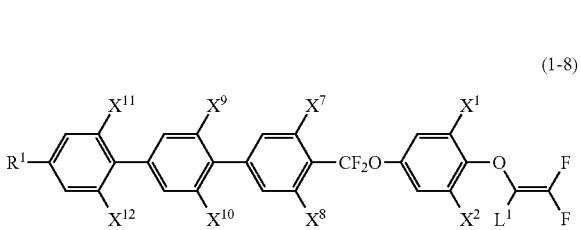 (1-8)

-continued

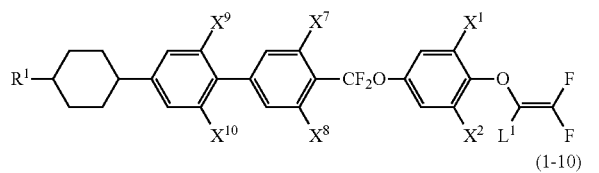
(1-9)

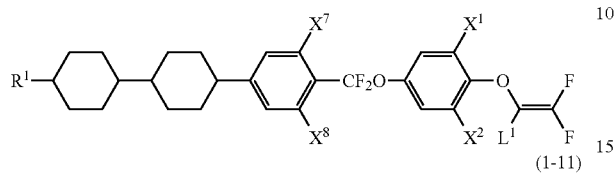
(1-10)

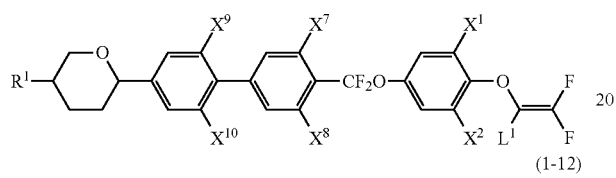
(1-11)

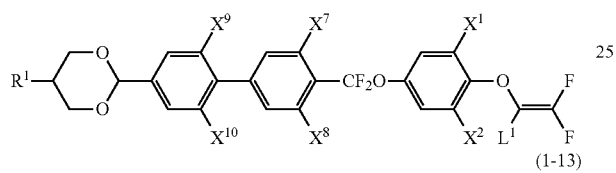
(1-12)

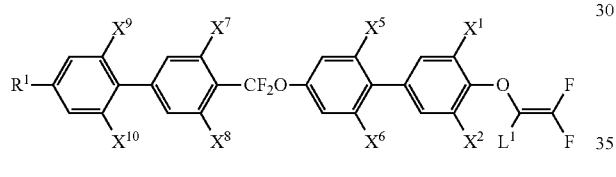
(1-13)

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine, $X^1$, $X^2$, $X^5$, $X^6$, $X^7$, $X^8$, $X^9$, $X^{10}$, $X^{11}$ and $X^{12}$ are independently hydrogen or fluorine, and $L^1$ is hydrogen or fluorine.

Item 3 is the liquid crystal composition according to item 1 or 2 that contains at least one compound selected from the group of compounds represented by formula (1-3) according to item 2 as the first component.

Item 4 is the liquid crystal composition according to any one of items 1 to 3 that contains at least one compound selected from the group of compounds represented by formula (1-4) according to item 2 as the first component.

Item 5 is the liquid crystal composition according to any one of items 1 to 4 that contains at least one compound selected from the group of compounds represented by formula (1-7) according to item 2 as the first component.

Item 6 is the liquid crystal composition according to any one of items 1 to 5 that contains at least one compound selected from the group of compounds represented by formula (1-8) according to item 2 as the first component.

Item 7 is the liquid crystal composition according to any one of items 1 to 6 that contains at least one compound selected from the group of compounds represented by formula (1-9) according to item 2 as the first component.

Item 8 is the liquid crystal composition according to any one of items 1 to 7 that contains at least one compound selected from the group of compounds represented by formula (1-12) according to item 2 as the first component.

Item 9 is the liquid crystal composition according to any one of items 1 to 8 that contains at least one compound selected from the group of compounds represented by formula (2-1) to formula (2-13) as the second component:

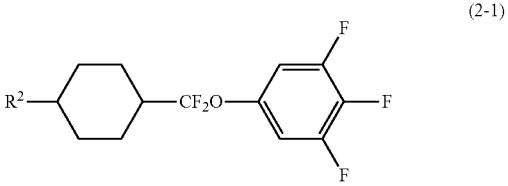
(2-1)

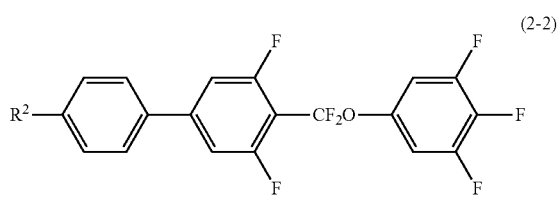
(2-2)

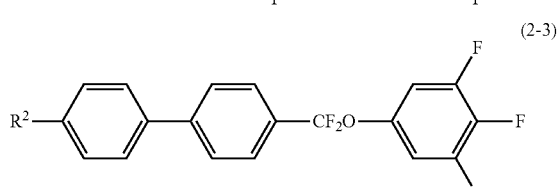
(2-3)

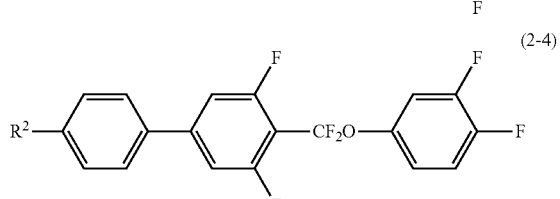
(2-4)

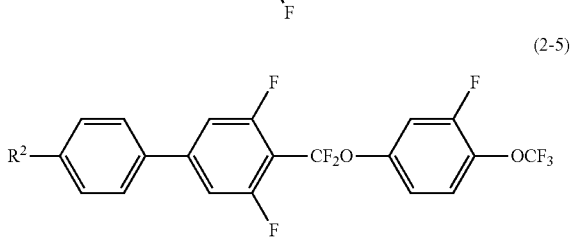
(2-5)

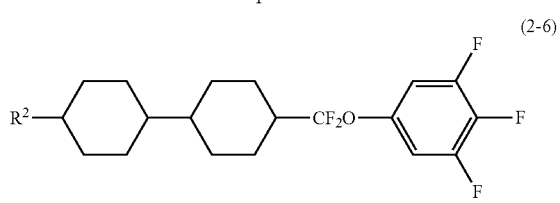
(2-6)

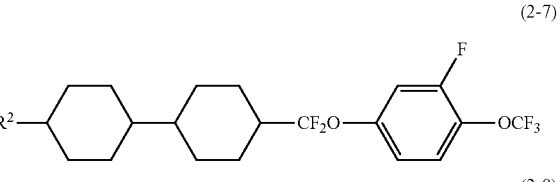
(2-7)

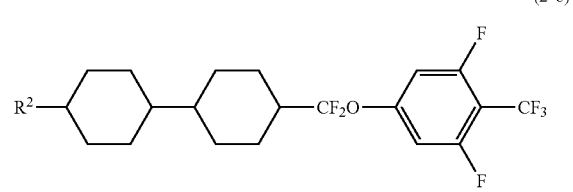
(2-8)

-continued

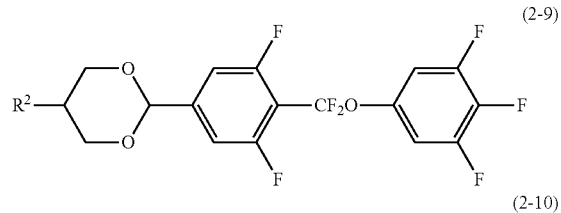
(2-9)

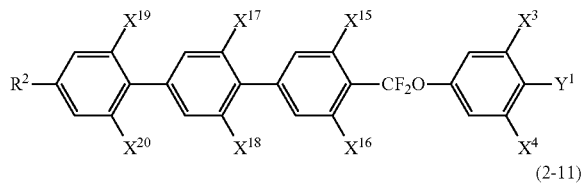
(2-10)

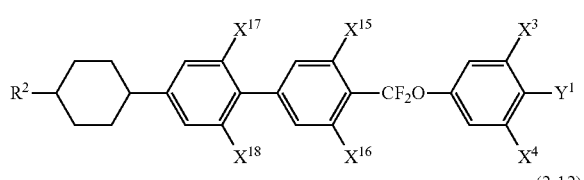
(2-11)

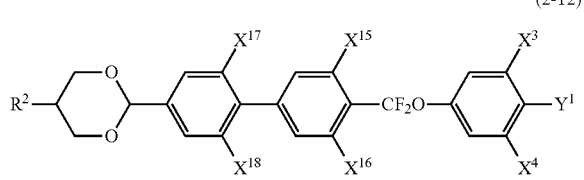
(2-12)

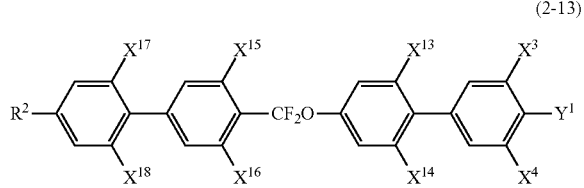
(2-13)

wherein $R^2$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $X^3$, $X^4$, $X^{13}$, $X^{14}$, $X^{15}$, $X^{16}$, $X^{17}$, $X^{18}$, $X^{19}$ and $X^{20}$ are independently hydrogen or fluorine; and $Y^1$ is fluorine, chlorine, trifluoromethyl or trifluoromethoxy.

Item 10 is the liquid crystal composition according to any one of items 1 to 9 that contains at least one compound selected from the group of compounds represented by formula (2-2) according to item 9 as the second component.

Item 11 is the liquid crystal composition according to any one of items 1 to 10 that contains at least one compound selected from the group of compounds represented by formula (2-3) according to item 9 as the second component.

Item 12 is the liquid crystal composition according to any one of items 1 to 11 that contains at least one compound selected from the group of compounds represented by formula (2-6) according to item 9 as the second component.

Item 13 is the liquid crystal composition according to any one of items 1 to 12 that contains at least one compound selected from the group of compounds represented by formula (2-9) according to item 9 as the second component.

Item 14 is the liquid crystal composition according to any one of items 1 to 13 that contains at least one compound selected from the group of compounds represented by formula (2-10) according to item 9 as the second component.

Item 15 is the liquid crystal composition according to any one of items 1 to 14 that contains at least one compound selected from the group of compounds represented by formula (2-11) according to item 9 as the second component.

Item 16 is the liquid crystal composition according to any one of items 1 to 15 that contains at least one compound selected from the group of compounds represented by formula (2-12) according to item 9 as the second component.

Item 17 is the liquid crystal composition according to any one of items 1 to 16, in which the proportion of the first component is in the range of 3 wt % to 40 wt %, and the proportion of the second component is in the range of 5 wt % to 60 wt %, based on the total weight of the liquid crystal composition.

Item 18 is the liquid crystal composition according to any one of items 1 to 17 that further contains at least one compound selected from the group of compounds represented by formula (3) as a third component:

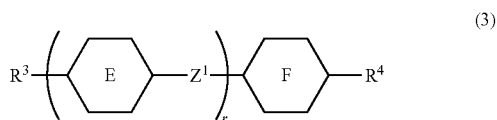
(3)

wherein $R^3$ and $R^4$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring E and ring F are independently 1,4-cyclohexylene, 1,4-phenylene, 2-fluoro-1,4-phenylene, 3-fluoro-1,4-phenylene or 2,5-difluoro-1,4-phenylene; $Z^1$ is a single bond, ethylene or carbonyloxy; and r is 1, 2 or 3.

Item 19 is the liquid crystal composition according to item 18 that contains at least one compound selected from the group of compounds represented by formula (3-1) to formula (3-13) as the third component:

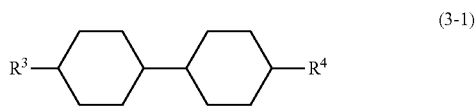
(3-1)

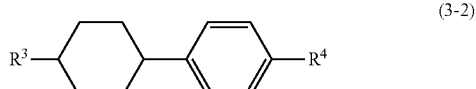
(3-2)

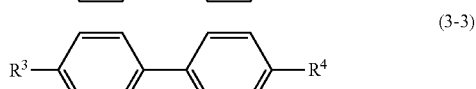
(3-3)

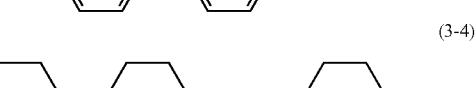
(3-4)

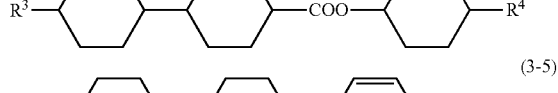
(3-5)

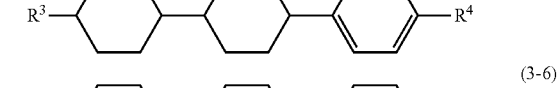
(3-6)

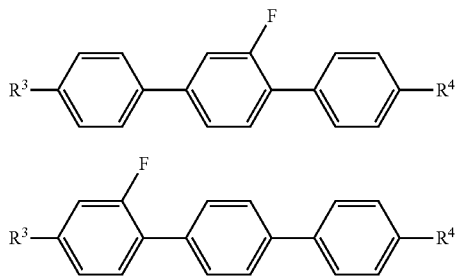
(3-7)

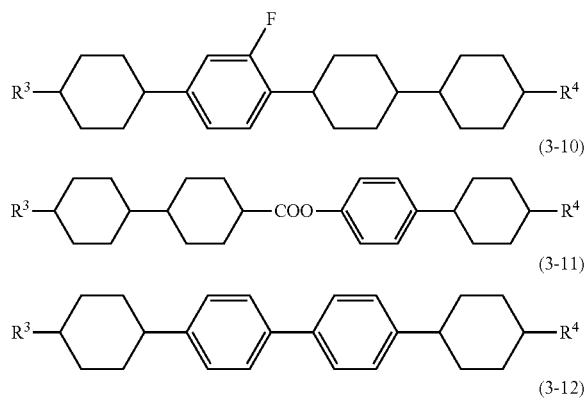
(3-8)
(3-9)
(3-10)
(3-11)

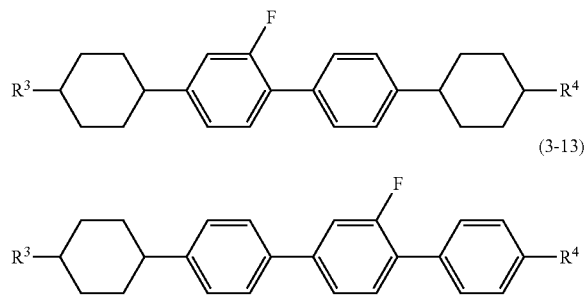
(3-12)
(3-13)

wherein $R^3$ and $R^4$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 20 is the liquid crystal composition according to item 18 or 19 that contains at least one compound selected from the group of compounds represented by formula (3-1) according to item 19 as the third component.

Item 21 is the liquid crystal composition according to any one of items 18 to 20 that contains at least one compound selected from the group of compounds represented by formula (3-5) according to item 19 as the third component.

Item 22 is the liquid crystal composition according to any one of items 18 to 21 that contains at least one compound selected from the group of compounds represented by formula (3-7) according to item 19 as the third component.

Item 23 is the liquid crystal composition according to any one of items 18 to 22 that contains at least one compound selected from the group of compounds represented by formula (3-13) according to item 19 as the third component.

Item 24 is the liquid crystal composition according to any one of items 18 to 23, in which the proportion of the third component is in the range of 25 wt % to 65 wt % based on the total weight of the liquid crystal composition.

Item 25 is the liquid crystal composition according to any one of items 1 to 24 that further contains at least one compound selected from the group of compounds represented by formula (4) as a fourth component:

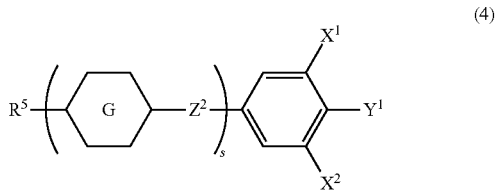
(4)

wherein $R^5$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring G is 1,4-cyclohexylene, 1,3-dioxane-2,5-diyl, 1,4-phenylene, 3-fluoro-1,4-phenylene, 3,5-difluoro-1,4-phenylene, 1,3-dioxane-2,5-diyl, tetrahydropyran-2,5-diyl or pyrimidine-2,5-diyl; $Z^2$ is a single bond, ethylene or carbonyloxy; $X^1$ and $X^2$ are independently hydrogen or fluorine; $Y^1$ is fluorine, chlorine, trifluoromethyl or trifluoromethoxy; and s is 1, 2 or 3.

Item 26 is the liquid crystal composition according to item 25 that contains at least one compound selected from the group of compounds represented by formula (4-1) to formula (4-16) as the fourth component:

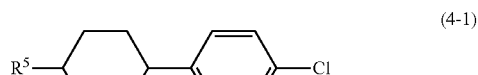
(4-1)

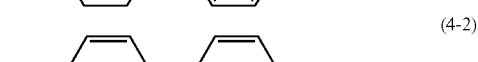
(4-2)

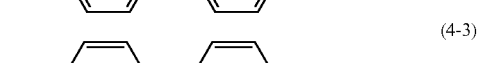
(4-3)

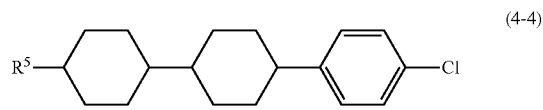
(4-4)

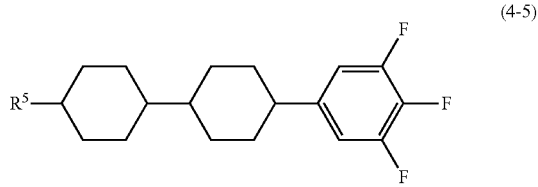
(4-5)

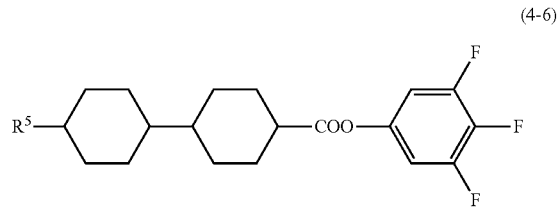
(4-6)

-continued (4-7) 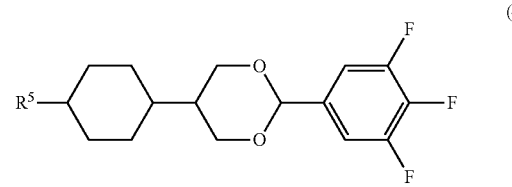

(4-8) 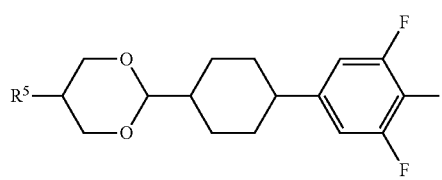

(4-9) 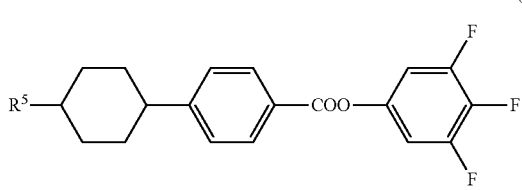

(4-10) 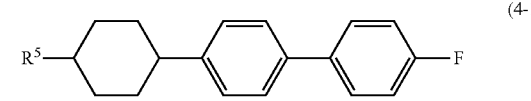

(4-11) 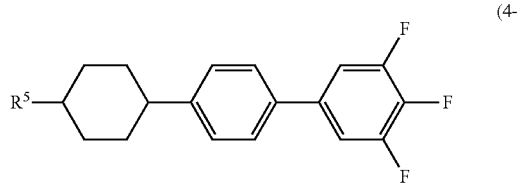

(4-12) 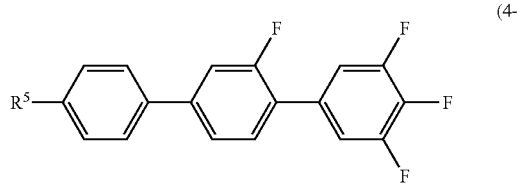

(4-13) 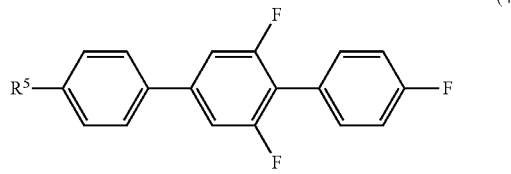

(4-14) 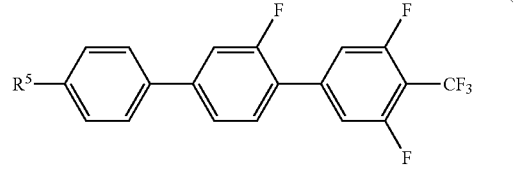

(4-15) 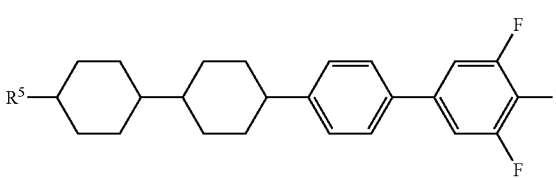

-continued (4-16) 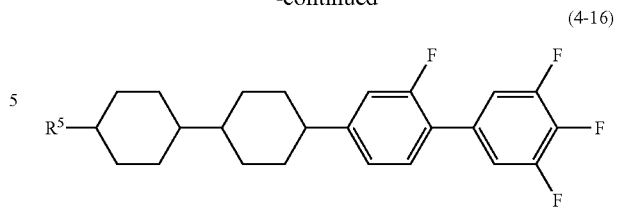

wherein $R^5$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 27 is the liquid crystal composition according to item 25 or 26 that contains at least one compound selected from the group of compounds represented by formula (4-11) according to item 26 as the fourth component.

Item 28 is the liquid crystal composition according to any one of items 25 to 27 that contains at least one compound selected from the group of compounds represented by formula (4-12) according to item 26 as the fourth component.

Item 29 is the liquid crystal composition according to any one of items 25 to 28, in which the proportion of the fourth component is in the range of 3 wt % to 30 wt % based on the total weight of the liquid crystal composition.

Item 30 is the liquid crystal composition according to any one of items 1 to 29, of which the maximum temperature of nematic phase is 70° C. or higher, the optical anisotropy (25° C.) at a wavelength of 589 nanometers is 0.08 or more, and the dielectric anisotropy (25° C.) at the frequency of 1 kHz is 2 or more.

Item 31 is a liquid crystal display device including the liquid crystal composition according to any one of items 1 to 30.

Item 32 is the liquid crystal display device according to item 31, of which the operating mode is a TN mode, an ECB mode, an OCB mode, an IPS mode, a PSA mode or an FPA mode, and the driving mode is an active matrix mode.

Item 33 is use of the liquid crystal composition according to any one of items 1 to 30 in a liquid crystal display device.

The invention further includes the following items: (1) the above composition further containing an optically active compound; (2) the above composition further containing an additive such as an antioxidant, an ultraviolet light absorber, an antifoaming agent, a polymerizable compound or a polymerization initiator; (3) an AM device including the composition; (4) a device including the composition and having a TN, ECB, OCB, IPS, FFS, PSA or FPA mode; (5) a transmissive device including the composition; (6) use of the composition as a composition having a nematic phase; and (7) use as an optically active composition by adding the optically active compound to the composition.

The composition of the invention will be explained in the following order. First, the constitution of the component compounds in the composition will be explained. Second, main characteristics of the component compounds and main effects of the compounds on the composition will be explained. Third, the combination of components in the composition, preferred proportions of the component compounds and the basis thereof will be explained. Fourth, preferred embodiments of the component compounds will be explained. Fifth, specific examples of the component compounds will be shown. Sixth, an additive that may be mixed with the composition will be explained. Seventh, methods for synthesizing the component compounds will be explained. Last, applications of the composition will be explained.

First, the constitution of the component compounds in the composition will be explained. The compositions of the invention are classified into composition A and composition B. Composition A may further contain any other liquid crystal compound, an additive, an impurity or the like in addition to the liquid crystal compounds selected from compound (1), compound (2), compound (3) and compound (4). "Any other liquid crystal compound" means a liquid crystal compound different from compound (1), compound (2), compound (3) and compound (4). Such a compound is mixed with the composition in order to further adjust the characteristics. Examples of the additive includes an optically active compound, an antioxidant, an ultraviolet absorbent, a dye, an antifoaming agent, a polymerizable compound and a polymerization initiator. The impurity includes a compound mixed in a process such as preparation of the component compounds. Even in a case where the compound is liquid crystalline, the compound is classified as the impurity herein.

Composition B consists essentially of compounds selected from the group of compound (1), compound (2), compound (3) and compound (4). The term "essentially" means that the composition may contain an additive and an impurity, but does not contain any liquid crystal compound different from the compounds. Composition B has a smaller number of components than composition A has. Composition B is preferred to composition A in view of cost reduction. Composition A is preferred to composition B in view of the possibility of further adjusting physical properties by mixing any other liquid crystal compound.

Second, the main characteristics of the component compounds and the main effects of the compounds on the characteristics of the composition will be explained. The main characteristics of the component compounds are summarized in Table 2 on the basis of advantageous effects of the invention. In Table 2, the symbol L stands for "large" or "high," the symbol M stands for "medium," and the symbol S stands for "small" or "low." The symbols L, M and S represent a classification based on a qualitative comparison among the component compounds, and 0 (zero) means "a value of nearly zero."

TABLE 2

Characteristics of Compounds

| Compounds | (1) | (2) | (3) | (4) |
|---|---|---|---|---|
| Maximum temperature | S to L | S to L | S to L | S to M |
| Viscosity | M to L | S to L | S to L | M to L |
| Optical anisotropy | M to L | S to L | S to L | M to L |
| Dielectric anisotropy | M to L | M to L | 0 | S to L |
| Specific resistance | L | L | L | L |

The main effects of the component compounds on the characteristics of the composition upon mixing the component compounds in the composition are described below. Compound (1) increases the dielectric anisotropy. Compound (2) increases the maximum temperature and increases the dielectric anisotropy. Compound (3) increases the maximum temperature, decreases the minimum temperature and decreases the viscosity. Compound (4) decreases the minimum temperature and increases the dielectric anisotropy.

Third, the combination of components in the composition, the preferred proportions of the component compounds and the basis thereof will be explained. The combination of components in the composition includes a combination of the first component and the second component, a combination of the first component, the second component and the third component, a combination of the first component, the second component and the fourth component, and a combination of the first component, the second component, the third component and the fourth component. The combinations of components of preferred compositions include the combination of the first component, the second component and the third component, and the combination of the first component, the second component, the third component and the fourth component.

A preferred proportion of the first component is approximately 3 wt % or more for increasing the dielectric anisotropy, and approximately 40 wt % or less for decreasing the minimum temperature. A further preferred proportion is in the range of approximately 4 wt % to approximately 30 wt %. A particularly preferred proportion is in the range of approximately 5 wt % to approximately 20 wt %.

A preferred proportion of the second component is approximately 5 wt % or more for increasing the maximum temperature or increasing the dielectric anisotropy, and approximately 60 wt % or less for decreasing the minimum temperature or decreasing the viscosity. A further preferred proportion is in the range of approximately 10 wt % to approximately 50 wt %. A particularly preferred proportion is in the range of approximately 15 wt % to approximately 40 wt %.

A preferred proportion of the third component is approximately 25 wt % or more for increasing the maximum temperature or decreasing the viscosity, and approximately 65 wt % or less for increasing the dielectric anisotropy. A further preferred proportion is in the range of approximately 30 wt % to approximately 60 wt %. A particularly preferred proportion is in the range of approximately 35 wt % to approximately 55 wt %.

The fourth component is suitable for preparing a composition that has a particularly large dielectric anisotropy. A preferred proportion of the component is in the range of approximately 3 wt % to approximately 30 wt %. A further preferred proportion is in the range of approximately 5 wt % to approximately 25 wt %. A particularly preferred proportion is in the range of approximately 10 wt % to approximately 20 wt %.

Fourth, the preferred embodiments of the component compounds will be explained.

$R^1$, $R^2$, $R^3$, $R^4$ and $R^5$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine. Preferred $R^1$, $R^2$, $R^3$, $R^4$ or $R^5$ is alkyl having 1 to 12 carbons for increasing the stability to ultraviolet light or heat, or alkenyl having 2 to 12 carbons for decreasing the minimum temperature or decreasing the viscosity.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on the position of the double bond. Trans is preferred in alkenyl such as 1-propenyl, 1-butenyl, 1-pentenyl, 1-hexenyl, 3-pentenyl and 3-hexenyl for decreasing the viscosity, for instance. Cis is preferred in alkenyl such as 2-butenyl, 2-pentenyl and 2-hexenyl. In the alkenyl, straight-chain alkenyl is preferred to branched-chain alkenyl.

Preferred examples of alkenyl in which at least one hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity.

Then, m is 1, 2 or 3, n is 0, 1 or 2, and the sum of m and n is 3 or less. Preferred m is 3 for increasing the maximum temperature. Preferred n is 0 for decreasing the minimum temperature. Then, p is 1, 2 or 3, q is 0, 1 or 2, and the sum of p and q is 3 or less. Preferred p is 3 for increasing the maximum temperature. Preferred q is 0 for decreasing the minimum temperature. Then, r is 1, 2 or 3. Preferred r is 1 for decreasing the viscosity. Then, s is 1, 2 or 3. Preferred s is 2 for decreasing the minimum temperature.

Ring A, ring B, ring C and ring D are independently 1,4-cyclohexylene, 1,4-phenylene, 3-fluoro-1,4-phenylene, 3,5-difluoro-1,4-phenylene, pyrimidine-2,5-diyl, 1,3-dioxane-2,5-diyl or tetrahydropyran-2,5-diyl, arbitrary two rings A when in is 2 or 3 may be identical or different, arbitrary two rings B when n is 2 may be identical or different, arbitrary two rings C when p is 2 or 3 may be identical or different, and two of arbitrary ring D when q is 2 may be identical or different. However, when one of the two rings C in a case where p is 2 is 1,4-cyclohexylene, the other is not 1,4-phenylene. Preferred ring A, ring B, ring C or ring D is 1,4-cyclohexylene for decreasing the viscosity, or 1,4-phenylene for increasing the optical anisotropy. Ring E and ring F are independently 1,4-cyclohexylene, 1,4-phenylene, 2-fluoro-1,4-phenylene, 3-fluoro-1,4-phenylene or 2,5-difluoro-1,4-phenylene. Arbitrary two rings E when r is 2 or 3 may be identical or different. Preferred ring E or ring F is 1,4-cyclohexylene for decreasing the viscosity, or 1,4-phenylene for increasing the optical anisotropy. Ring G is 1,4-cyclohexylene, 1,3-dioxane-2,5-diyl, 1,4-phenylene, 3-fluoro-1,4-phenylene, 3,5-difluoro-1,4-phenylene or 2,5-pyrimidine, and arbitrary two rings G when s is 2 or 3 may be identical or different. Preferred ring G is 1,4-phenylene or 3-fluoro-1,4-phenylene for increasing the optical anisotropy.

$Z^1$ and $Z^2$ are independently a single bond, ethylene or carbonyloxy. Arbitrary two $Z^1$ when r is 2 or 3 may be identical or different, and arbitrary two $Z^2$ when s is 2 or 3 may be identical or different. Preferred $Z^1$ is a single bond for decreasing the viscosity. Preferred $Z^2$ is a single bond for decreasing the viscosity, or carbonyloxy for increasing the dielectric anisotropy.

$X^1, X^2, X^3, X^4, X^5, X^6, X^7, X^8, X^9, X^{10}, X^{11}, X^{12}, X^{13}, X^{14}, X^{15}, X^{16}, X^{17}, X^{18}, X^{19}$ and $X^{20}$ are independently hydrogen, fluorine, or chlorine. Preferred $X^1, X^2, X^3, X^4, X^5, X^6, X^7, X^8, X^9, X^{10}, X^{11}, X^{12}, X^{13}, X^{14}, X^{15}, X^{16}, X^{17}, X^{18}, X^{19}$ and $X^{20}$ is fluorine for decreasing the viscosity.

$Y^1$ is fluorine, chlorine, trifluoromethyl or trifluoromethoxy. Preferred $Y^1$ is fluorine for decreasing the minimum temperature.

Fifth, the specific examples of the component compounds will be shown. In the preferred compounds below, $R^6$ and $R^7$ are independently alkyl having 1 to 12 carbons. $R^8$ is alkyl having 1 to 12 carbons or alkoxy having 1 to 12 carbons. $R^9$, $R^{10}$ and $R^{11}$ are independently straight-chain alkyl having 1 to 12 carbons or straight-chain alkenyl having 2 to 12 carbons.

Preferred compounds (1) include compounds (1-1-1) to (1-13-1). Further preferred compounds (1) include compounds (1-3-1), (1-3-2), (1-4-1), (1-4-2), (1-7-1), (1-8-1), (1-9-1) and (1-12-1). Particularly preferred compounds (1) include compounds (1-3-1), (1-4-1) and (1-8-1). Preferred compounds (2) include compounds (2-1-1) to (2-13-1). Further preferred compounds (2) include compounds (2-2-1), (2-3-1), (2-7-1), (2-10-1), (2-11-1) to (2-11-3) and (2-12-1). Particularly preferred compounds (2) include compounds (2-2-1), (2-7-1), (2-10-1) and (2-11-1). Preferred compounds (3) include compounds (3-1-1) to (3-14-1). Further preferred compounds (3) include compounds (3-1-1), (3-5-1), (3-7-1) and (3-14-1). Particularly preferred compounds (3) include compounds (3-1-1), (3-5-1) and (3-7-1). Preferred compounds (4) include compounds (4-1-1) to (4-16-1). Further preferred compounds (4) include compounds (4-5-1), (4-11-1), (4-12-1) and (4-15-1), wherein compounds (4-5-1), (4-11-1) and (4-12-1) are particularly preferred.

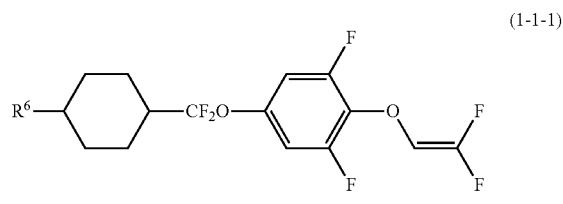

(1-1-1)

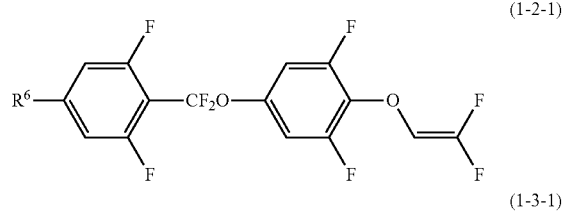

(1-2-1)

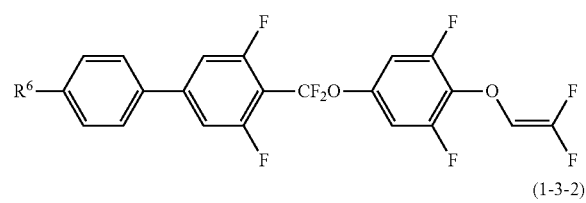

(1-3-1)

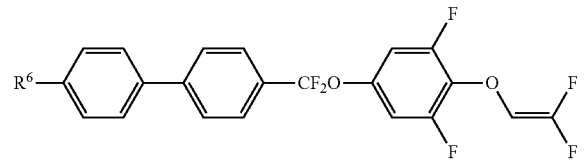

(1-3-2)

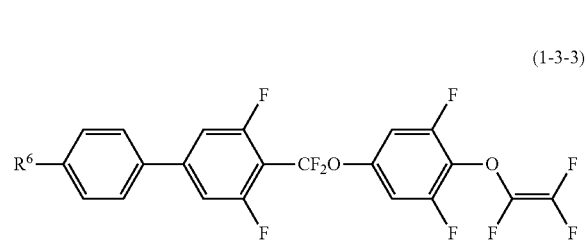

(1-3-3)

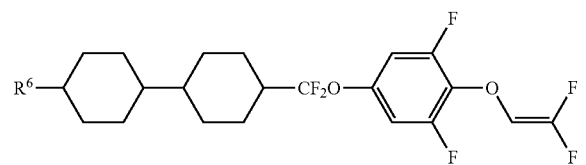

(1-4-1)

(1-4-2)
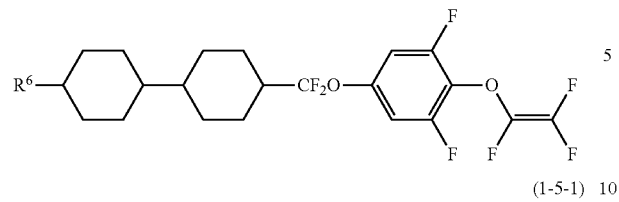
(1-5-1)
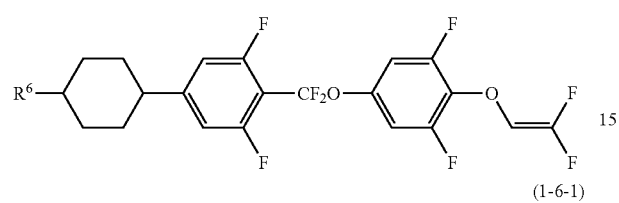
(1-6-1)
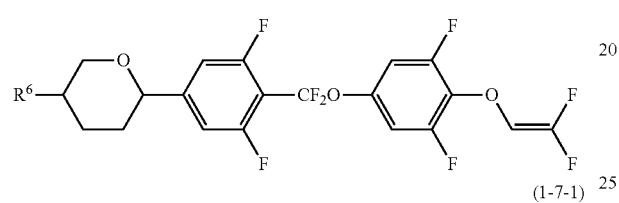
(1-7-1)
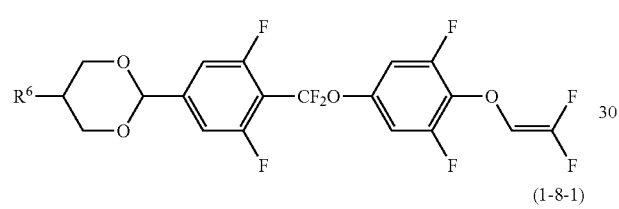
(1-8-1)
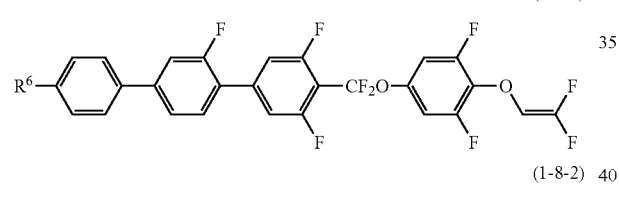
(1-8-2)
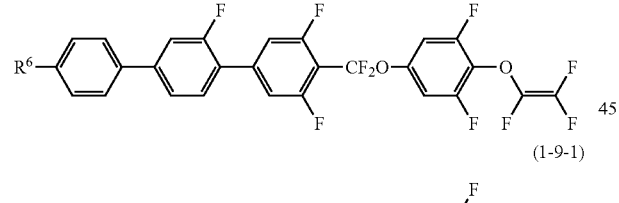
(1-9-1)
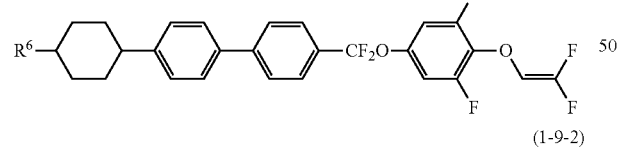
(1-9-2)
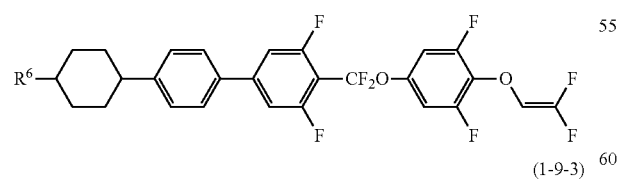
(1-9-3)
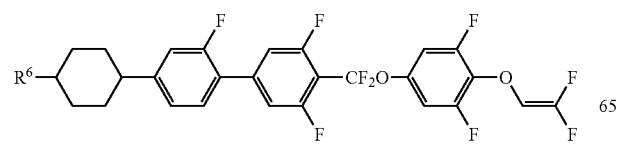
(1-10-1)
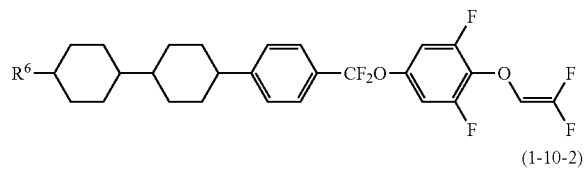
(1-10-2)
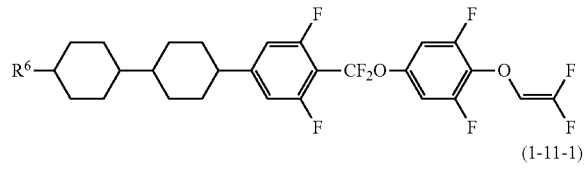
(1-11-1)
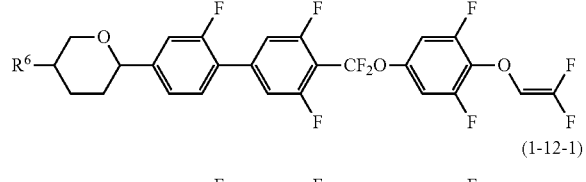
(1-12-1)
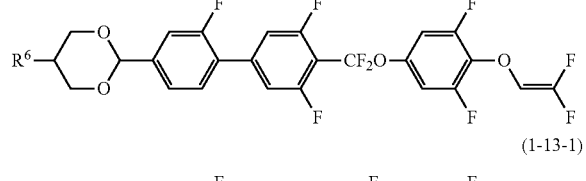
(1-13-1)
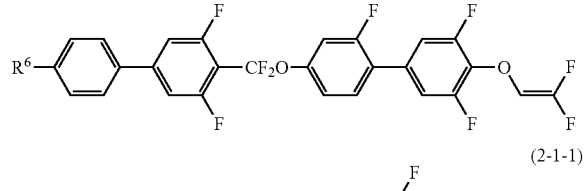
(2-1-1)
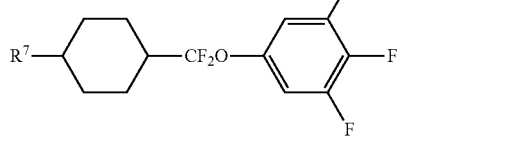
(2-2-1)
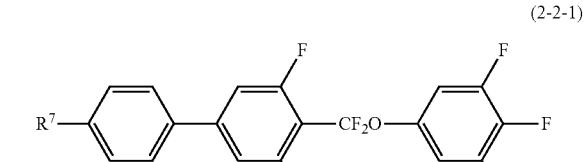
(2-3-1)
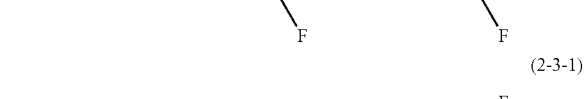
(2-4-1)
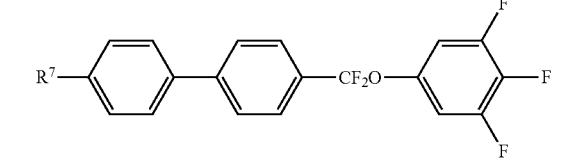
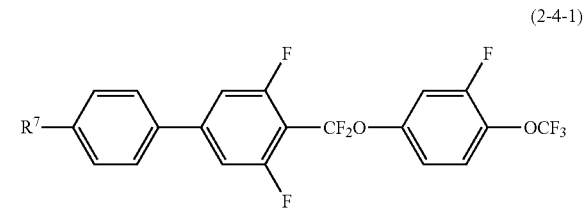

(2-5-1)
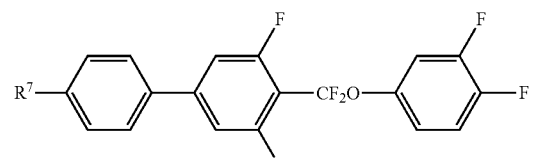
(2-6-1)
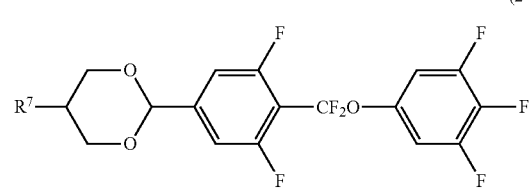
(2-7-1)
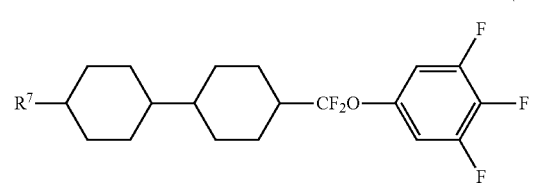
(2-8-1)
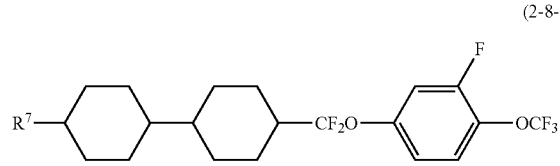
(2-9-1)
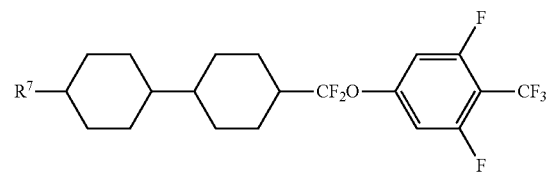
(2-10-1)
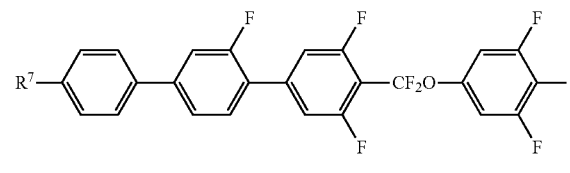
(2-10-2)
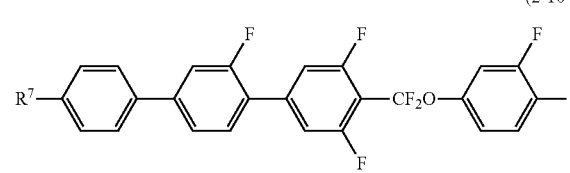
(2-10-3)
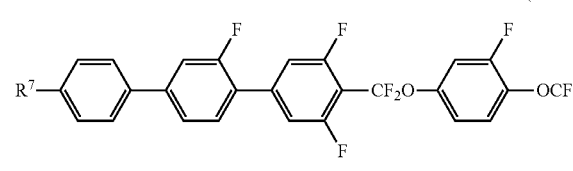
(2-11-1)
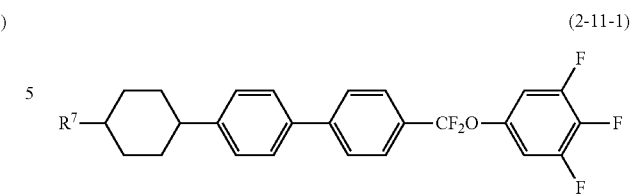
(2-11-2)
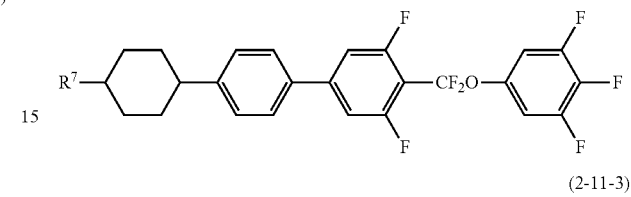
(2-11-3)
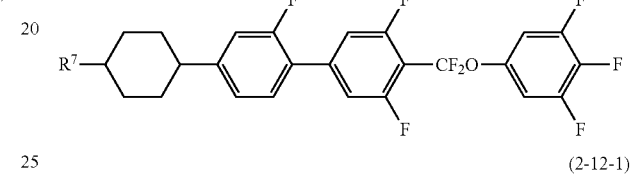
(2-12-1)
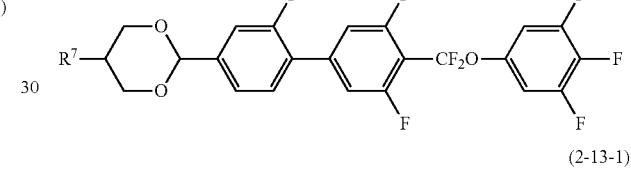
(2-13-1)
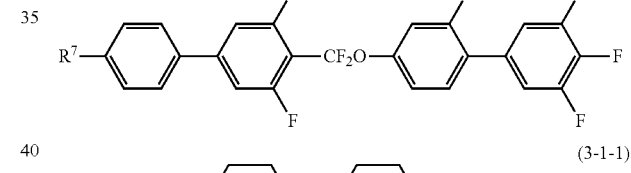
(3-1-1)
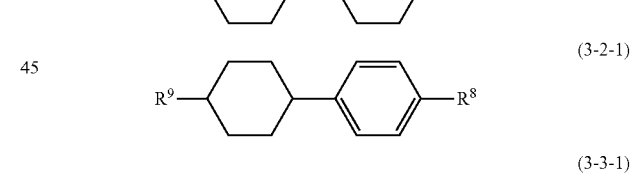
(3-2-1)
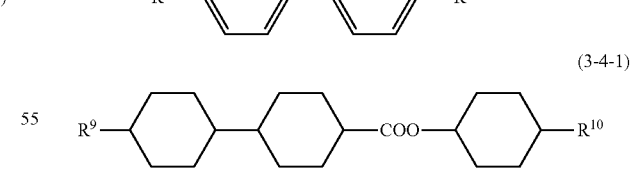
(3-3-1)
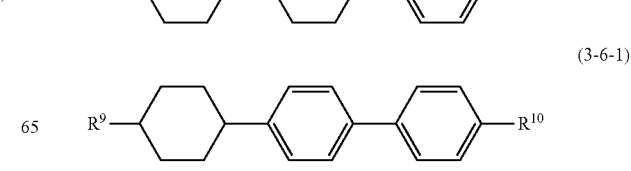
(3-4-1)
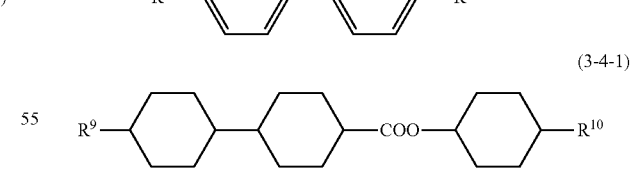
(3-5-1)
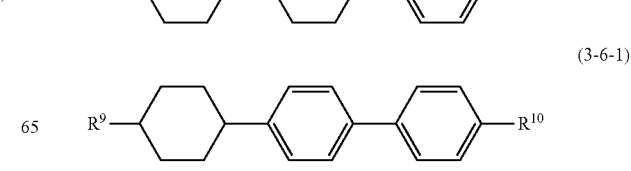
(3-6-1)
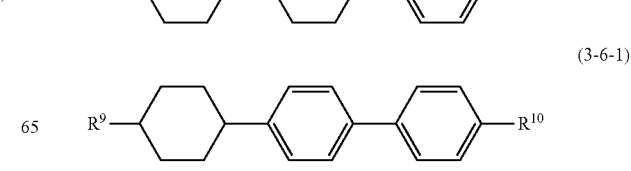

(3-7-1)
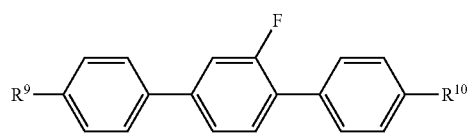
(3-8-1)
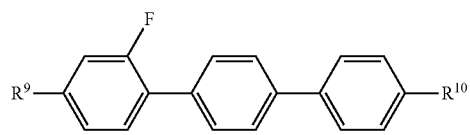
(3-9-1)
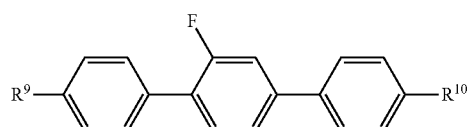
(3-10-1)
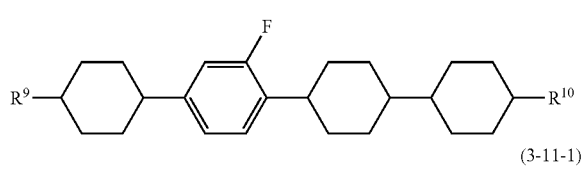
(3-11-1)
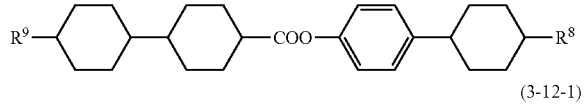
(3-12-1)
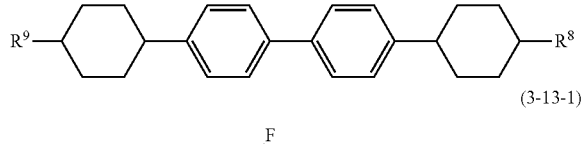
(3-13-1)
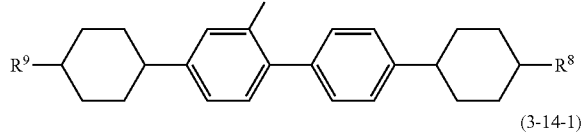
(3-14-1)
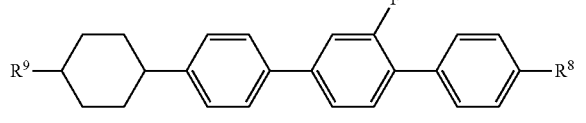
(4-1-1)
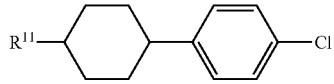
(4-2-1)
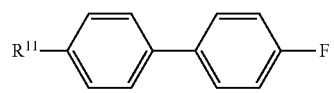
(4-3-1)
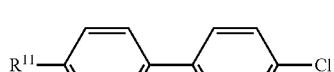
(4-4-1)
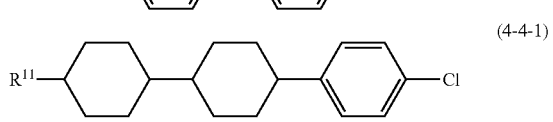
(4-5-1)
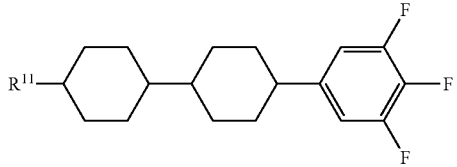
(4-6-1)
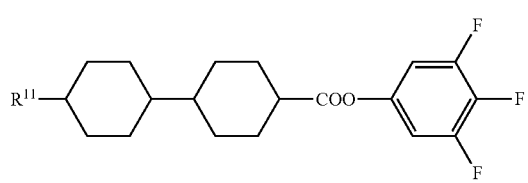
(4-7-1)
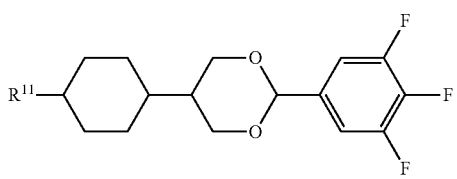
(4-8-1)
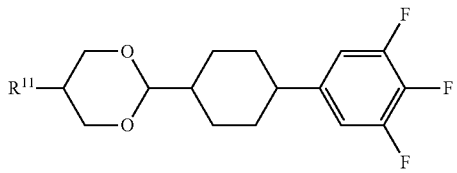
(4-9-1)
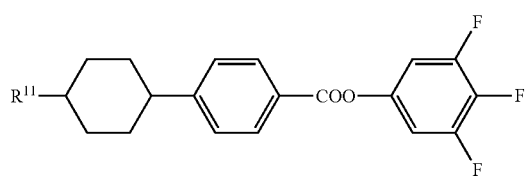
(4-10-1)
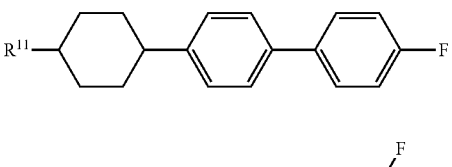
(4-11-1)
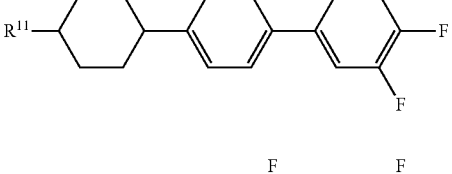
(4-12-1)
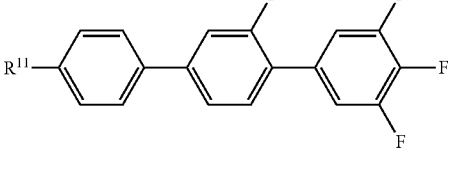
(4-13-1)
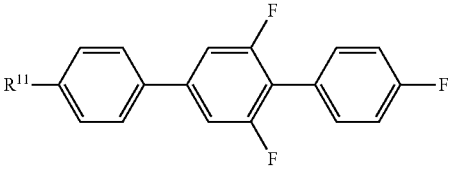

(4-14-1)
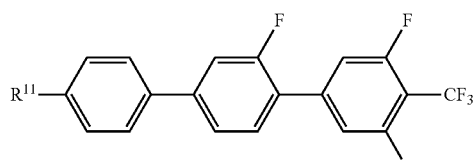

(4-15-1)
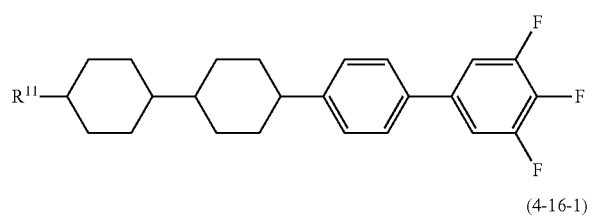

(4-16-1)
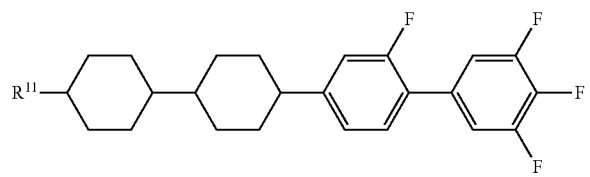

Sixth, the additive that may be mixed in the composition will be explained. Such additives include an optically active compound, an antioxidant, an ultraviolet absorbent, a dye, an antifoaming agent, a polymerizable compound and a polymerization initiator. The optically active compound is mixed in the composition in order to induce a helical structure in liquid crystals to give a twist angle. Examples of such a compound include compounds (5-1) to (5-5). A preferred proportion of the optically active compound is approximately 5 wt % or less. A further preferred proportion is in the range of approximately 0.01 wt % to approximately 2 wt %.

(5-1)
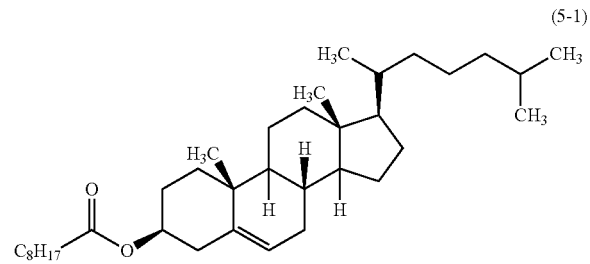

(5-2)
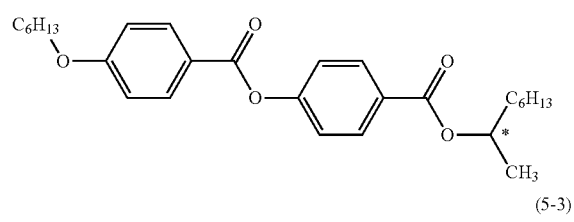

(5-3)
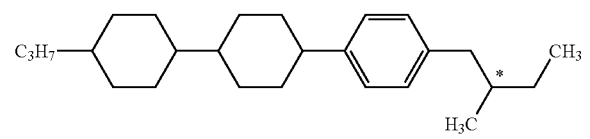

(5-4)
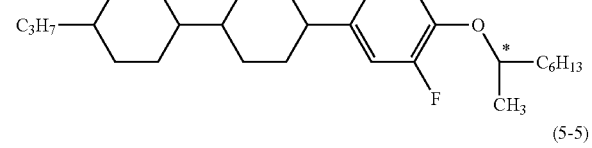

(5-5)
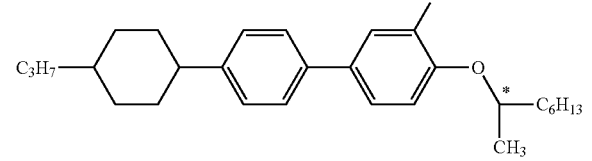

The antioxidant is mixed in the composition in order to prevent a decrease in the specific resistance caused by heating in air, or to maintain a large voltage holding ratio at room temperature and also at a temperature close to the maximum temperature of the nematic phase after the device has been used for a long period of time.

(6)
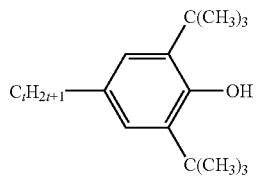

Preferred examples of the antioxidant include compound (6) where t is an integer from 1 to 9. In compound (6), preferred t is 1, 3, 5, 7 or 9. Further preferred t is 7. Compound (6) where t is 7 is effective in maintaining a large voltage holding ratio at room temperature and also at a temperature close to the maximum temperature of the nematic phase after the device has been used for a long period of time because such compound (6) has a small volatility. A preferred proportion of the antioxidant is approximately 50 ppm or more for achieving the effect thereof, and approximately 600 ppm or less for avoiding a decrease in the maximum temperature or avoiding an increase in the minimum temperature. A further preferred proportion is in the range of approximately 100 ppm to approximately 300 ppm.

Preferred examples of the ultraviolet absorbent include a benzophenone derivative, a benzoate derivative and a triazole derivative. A light stabilizer such as an amine having steric hindrance is also preferred. A preferred proportion of the ultraviolet absorbent or the stabilizer is approximately 50 ppm or more for achieving the effect thereof, and approximately 10,000 ppm or less for avoiding a decrease in the maximum temperature or avoiding an increase in the minimum temperature. A further preferred proportion is in the range of approximately 100 ppm to approximately 10,000 ppm.

A dichroic dye such as an azo dye or an anthraquinone dye may be mixed in the composition to adapt the same to a device having a guest host (GH) mode. A preferred proportion of the dye is in the range of approximately 0.01 wt % to approximately 10 wt %. The antifoaming agent such as dimethyl silicone oil or methyl phenyl silicone oil is mixed in the composition for preventing foam formation. A preferred proportion of the antifoaming agent is approximately 1 ppm or more for achieving the effect thereof, and approximately 1,000 ppm or less for avoiding a poor display. A further preferred proportion is in the range of approximately 1 ppm to approximately 500 ppm.

The polymerizable compound is mixed in the composition to adapt the same to a device having the polymer sustained alignment (PSA) mode. Preferred examples of the polymerizable compound include compounds having a polymerizable group, such as an acrylate, a methacrylate, a vinyl compound, a vinyloxy compound, a propenyl ether, an epoxy compound (oxirane, oxetane) and a vinyl ketone. Particularly preferred examples include an acrylate derivative or a methacrylate derivative. A preferred proportion of the polymerizable compound is approximately 0.05 wt % or more for achieving the effect thereof; and approximately 10 wt % or less for avoiding a poor display. A further preferred proportion is in the range of approximately 0.1 wt % to approximately 2 wt %. The polymerizable compound is preferably polymerized by irradiation with ultraviolet light or the like in the presence of a suitable initiator such as a photopolymerization initiator. Suitable conditions for polymerization, suitable types of the initiator and suitable amounts thereof are known to those skilled in the art and are described in literatures. For example, Irgacure 651 (registered trade name; by BASF), Irgacure 184 (registered trade name; by BASF) or Darocure 1173 (registered trade name; by BASF), each being a photoinitiator, is suitable for radical polymerization. A preferred proportion of the photopolymerization initiator is in the range of approximately 0.1 wt % to approximately 5 wt % of the polymerizable compound, and a particularly preferred proportion is in the range of approximately 1 wt % to approximately 3 wt %.

Seventh, the methods for synthesizing the component compounds will be explained. Compounds (1) to (4) can be prepared by a known method. Examples of synthetic methods will be shown. Compound (2-2-1) is prepared by the method described in JP H10-251186 A. Compound (3-1-1) is prepared by the method described in JP S59-70624 A. Compound (4-11-1) is prepared by the method described in JP H2-233626 A. The antioxidant is commercially available. A compound represented by formula (6) of t=1 is available from Sigma-Aldrich Corporation. Compound (6) of t=7 and so on are prepared according to the method described in U.S. Pat. No. 3,660,505 B.

Any compounds whose synthetic methods are not described above can be prepared by the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the applications of the composition will be explained. The composition of the invention mainly has a minimum temperature of approximately −10° C. or lower, a maximum temperature of approximately 70° C. or higher, and an optical anisotropy in the range of approximately 0.07 to approximately 0.20. The device including the composition has a large voltage holding ratio. The composition is suitable for use in an AM device. The composition is particularly suitable for use in a transmissive AM device. The composition having an optical anisotropy in the range of approximately 0.08 to approximately 0.25, and also the composition having an optical anisotropy in the range of approximately 0.10 to approximately 0.30 may be prepared by controlling the proportions of the component compounds or by mixing with any other liquid crystal compound. The composition can be used as a composition having a nematic phase, or as an optically active composition by adding an optically active compound.

The composition can be used for AM devices. The composition can also be used for PM devices. The composition can also be used for AM devices and PM devices having a mode such as PC, TN, STN, ECB, OCB, IPS, FFS, VA, PSA or FPA. Use for an AM device having the TN, OCB, IPS or FFS mode is particularly preferred. In the AM device having the IPS mode or the FFS mode, alignment of the liquid crystal molecules in a state where no voltage is applied may be parallel or perpendicular relative to a panel substrate. The devices may be of a reflective type, a transmissive type or a transflective type. Use for the transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, and for a polymer dispersed (PD) device in which a three-dimensional network-polymer is formed in the composition.

The following examples are for illustrative purposes only and are not intended, nor should they be interpreted to, limit the scope of the invention.

EXAMPLES

In order to evaluate characteristics of a composition or a compound to be contained in a composition, the composition or the compound were made a measurement object. When the measurement object was a composition, it was measured as a sample as was, and the obtained values were recorded. When the measurement object was a compound, a sample for measurement was prepared by mixing the compound (15 wt %) with a base liquid crystal (85 wt %). The characteristic values of the compound were calculated using the values obtained by measurement, according to the extrapolation method: (extrapolated value)={(measured value of the sample for measurement)−0.85×(measured value of base liquid crystal)}/0.15. When a smectic phase (or crystals) precipitated at the ratio thereof at 25° C., the ratio of the compound to the base liquid crystal was changed step by step in the order of (10 wt %:90 wt %), (5 wt %:95 wt %) and (1 wt %:99 wt %). The values of the maximum temperature, optical anisotropy, viscosity and dielectric anisotropy with regard to the compound were obtained according to the extrapolation method.

The components of the base liquid crystal are described below. The proportion of each component is expressed in terms of wt %.

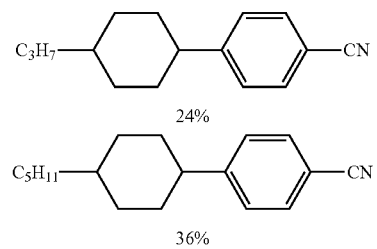

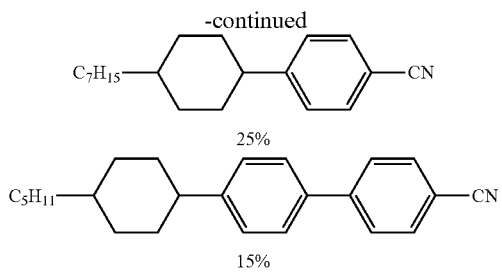

25%

15%

The characteristic values were measured according to the methods described below. Most of them were methods described in the standard discussed and established by Japan Electronics and Information Technology Industries Association (hereinafter, abbreviated to JEITA), JEITA ED-2521B, or as modified versions thereof.

Maximum temperature of nematic phase (NI; °C.): A sample was placed on a hot plate in a melting point apparatus equipped with a polarizing microscope and was heated at a rate of 1° C. per minute. The temperature at which a part of the sample began to change from a nematic phase to an isotropic liquid was measured. The higher limit of the temperature range of the nematic phase may be occasionally abbreviated to "maximum temperature."

Minimum temperature of nematic phase ($T_c$; °C.): Samples each having a nematic phase were put in glass vials and kept in freezers at temperatures of 0° C., −10° C., −20° C., −30° C. and −40° C. for 10 days, and then observed for liquid crystal phases. For example, when a sample maintained the nematic phase at −20° C. and changed to crystals or a smectic phase at −30° C., $T_c$ was recorded as $T_c < -20°$ C. The lower limit of the temperature range of the nematic phase may be occasionally abbreviated to "minimum temperature."

Viscosity (bulk viscosity; measured at 20° C.; mPa·s): A cone-plate (E type) rotational viscometer was used for measurement.

Viscosity (rotational viscosity; γ1; measured at 25° C.; mPa·s): The measurement was carried out according to the method described in M. Imai et al., Molecular Crystals and Liquid Crystals, Vol. 259, p. 37 (1995). A sample was put in a TN device with a twist angle of 0 degrees and a distance (cell gap) of 5 micrometers between two glass substrates. A voltage was stepwise applied to the device in the range of 16 V to 19.5 V at an increment of 0.5 V. After a period of 0.2 second with no application, a voltage was applied repeatedly under conditions of only one of rectangular waves (rectangular pulse; 0.2 second) and no application (2 seconds). The peak current and the peak time of a transient current generated by the application were measured. A value of rotational viscosity was obtained from the measured values using equation (8) in page 40 of the above paper of M. Imai et al. The value of dielectric anisotropy necessary for the calculation was determined according to a method as described below by using the device used for measuring the rotational viscosity.

Optical anisotropy (refractive index anisotropy; Δn; measured at 25° C.): Measurement was carried out by means of an Abbe refractometer with a polarizing plate mounted on an ocular, using light at a wavelength of 589 nanometers. A surface of a main prism was rubbed in one direction, and then a sample was added dropwise onto the main prism. The refractive index $n_{//}$ was measured when the direction of polarized light was parallel to the direction of rubbing. The refractive index $n_\perp$ was measured when the direction of polarized light was perpendicular to the direction of rubbing. The value of optical anisotropy was calculated from the equation of $\Delta n = n_{//} - n_\perp$.

Dielectric anisotropy (Δ∈; measured at 25° C.): A sample was put in a TN device with a distance (cell gap) of 9 micrometers between two glass substrates and a twist angle of 80 degrees. Sine waves (10 V, 1 kHz) were applied to the device, and after 2 seconds, the dielectric constant $\in_{//}$ in the major axis direction of liquid crystal molecules was measured. Sine waves (0.5 V, 1 kHz) were applied to the device, and after 2 seconds, the dielectric constant $\in_\perp$ in the minor axis direction of the liquid crystal molecules was measured. The value of dielectric anisotropy was calculated with the equation of $\Delta\in = \in_{//} - \in_\perp$.

Threshold voltage (Vth; measured at 25° C.; V): An LCD-5100 luminance meter made by Otsuka Electronics Co., Ltd. was used for the measurement. The light source was a halogen lamp. A sample was put in a normally white mode TN device with a distance (cell gap) 0.45/Δn (μm) between two glass substrates and a twist angle of 80 degrees. A voltage (32 Hz, rectangular waves) being increased stepwise from 0 V to 10 V at an increment of 0.02 V was applied to the device. On the occasion, the device was irradiated with light from a direction perpendicular to the device, and the amount of light transmitted through the device was measured. A voltage-transmittance curve was prepared, in which the maximum amount of light corresponds to 100% transmittance and the minimum amount of light corresponds to 0% transmittance. The voltage at 90% transmittance was recorded as the threshold voltage.

Voltage holding ratio (VHR-1; measured at 25° C.; %): A TN device having a polyimide alignment film and a distance (cell gap) of 5 micrometers between two glass substrates was used for the measurement. A sample was put in the device, and then the device was sealed with an ultraviolet-curable adhesive. A pulse voltage (60 microseconds at 5 V) was applied to the device to charge the same. The decaying voltage was measured for 16.7 milliseconds with a high-speed voltmeter, and area A between a voltage curve and a horizontal axis in a unit cycle was determined. Area B is an area without decay. The voltage holding ratio was the percentage of area A to area B.

Voltage holding ratio (VHR-2; measured at 80° C.; %): A TN device having a polyimide alignment film and a distance (cell gap) of 5 micrometers between two glass substrates was used for the measurement. A sample was put in the device, and then the device was sealed with an ultraviolet-curable adhesive. A pulse voltage (60 ms at 5 V) was applied to the TN device to charge the same. The decaying voltage was measured for 16.7 milliseconds with a high-speed voltmeter, and area A between a voltage curve and a horizontal axis in a unit cycle was determined. Area B is an area without decay. The voltage holding ratio is the percentage of area A to area B.

Voltage holding ratio (VHR-3; measured at 25° C.; %): The stability to ultraviolet light was evaluated by measuring a voltage holding ratio after a device was irradiated with ultraviolet light. A TN device having a polyimide alignment film and a cell gap of 5 micrometers was used for the measurement. A sample was injected into the device, and then the device was irradiated with light for 20 minutes. The light source was an ultra high-pressure mercury lamp USH-500D (made by Ushio, Inc.), and the distance between the device and the light source was 20 centimeters. In measuring VHR-3, the decaying voltage was measured for 16.7 milliseconds. A composition having a large VHR-3 has a high stability to ultraviolet light. The value of VHR-3 is preferably 90% or more, further preferably 95% or more.

Voltage holding ratio (VHR-4; measured at 25° C.; %): A TN device into which a sample was injected was heated in a constant-temperature bath at 80° C. for 500 hours, and then the stability to heat was evaluated by measuring the voltage holding ratio. In measuring VHR-4, the decaying voltage was measured for 16.7 milliseconds. A composition having a large VHR-4 has a high stability to heat.

Response time ($\tau$; measured at 25° C.; ms): An LCD-5100 luminance meter made by Otsuka Electronics Co., Ltd. was used for the measurement. The light source was a halogen lamp. A low-pass filter was set at 5 kHz. A sample was put in a normally white mode TN device with a distance (cell gap) of 5.0 micrometers between two glass substrates and a twist angle of 80 degrees. Rectangular waves (60 Hz, 5 V, 0.5 second) were applied to the device. On the occasion, the device was irradiated with light from a direction perpendicular to the device, and the amount of light passing through the device was measured. The maximum amount of light corresponds to 100% transmittance, and the minimum amount of light corresponds to 0% transmittance. The rise time ($\tau_r$; ms) is a period of time needed for a change from 90% transmittance to 10% transmittance. The fall time ($\tau_f$; ms) is a period of time needed for a change from 10% transmittance to 90% transmittance. The response time is the sum of the rise time and fall time thus obtained.

Elastic constant (K; measured at 25° C.; pN): A HP4284A LCR Meter made by Yokogawa-Hewlett-Packard Co. was used for the measurement. A sample was put in a horizontal alignment cell with a distance (cell gap) of 20 micrometers between two glass substrates. A voltage in the range of 0 V to 20 V was applied to the cell, and the electrostatic capacity and the applied voltage were measured. The measured values of the electrostatic capacity (C) and the applied voltage (V) were fitted to equation (2. 98) and equation (2. 101) in page 75 of "Liquid Crystal Device Handbook" (Ekisho Debaisu Handobukku in Japanese) (Nikkan Kogyo Shimbun, Ltd.), and the values of K11 and K33 were obtained from equation (2. 99). Next, K22 was calculated using the previously determined values of K11 and K33 in equation (3. 18) in page 171 of the same Handbook. The elastic constant is an average of thus determined K11, K22 and K33.

Specific resistance ($\rho$; measured at 25° C.; $\Omega$/cm): Into a vessel equipped with electrodes, 1.0 milliliter of a sample was injected. A DC voltage (10 V) was applied to the vessel, and the DC current after 10 seconds was measured. The specific resistance was calculated from the following equation: (specific resistance)={(voltage)×(electric capacity of a vessel)}/{(direct current)×(dielectric constant of vacuum)}.

Helical pitch (P; measured at room temperature; $\mu$m): A helical pitch was measured according to a wedge method (Handbook of Liquid Crystals (Ekisho Binran in Japanese), page 196, (issued in 2000, Maruzen Co., Ltd.)). A sample was injected into a wedge cell and left to stand at room temperature for 2 hours, and then a gap (d2−d1) between disclination lines was observed by means of a polarizing microscope (trade name: MM40/60 series, by Nikon Corporation). The helical pitch (P) was calculated according to the following equation in which the angle of the wedge cell was expressed as $\theta$: P=2×(d2−d1)×tan $\theta$.

Gas chromatographic analysis: GC-14B Gas Chromatograph made by Shimadzu Corporation was used for the measurement. The carrier gas was helium (2 mL per minute). The sample injector and the detector (FID) were set to 280° C. and 300° C., respectively. A capillary column DB-1 (length 30 m, bore 0.32 mm, film thickness 0.25 $\mu$m; dimethylpolysiloxane as a stationary phase, non-polar) made by Agilent Technologies, Inc. was used for separation of component compounds.

After the column was kept at 200° C. for 2 minutes, it was heated to 280° C. at a rate of 5° C./min. A sample was prepared in an acetone solution (0.1 wt %), and then 1 $\mu$L of the solution was injected into the sample injector. The recorder was C-R5A Chromatopac made by Shimadzu Corporation or the equivalent thereof. The resulting chromatogram showed a retention time of a peak and a peak area corresponding to each of the component compounds.

As a solvent for diluting the sample, chloroform, hexane and so forth may also be used. The following capillary columns may also be used for separating the component compounds: HP-1 (length 30 m, bore 0.32 mm, film thickness 0.25 $\mu$m) made by Agilent Technologies, Inc., Rtx-1 (length 30 m, bore 0.32 mm, film thickness 0.25 $\mu$m) made by Restek Corporation, and BP-1 (length 30 m, bore 0.32 mm, film thickness 0.25 $\mu$m) made by SGE International Pty. Ltd. A capillary column CBP1-M50-025 (length 50 m, bore 0.25 mm, film thickness 0.25 $\mu$m) made by Shimadzu Corporation may also be used in order to avoid an overlap of peaks of the compounds.

The proportions of the liquid crystal compounds included in the composition may be calculated by the method described below. The liquid crystal compounds can be detected by means of a gas chromatograph. The proportions of the peak areas in the gas chromatogram corresponds to the proportions (in molar number) of the liquid crystal compounds. When the capillary columns described above were used, the correction coefficient of each of the liquid crystal compounds may be regarded as 1 (one). Accordingly, the proportions (wt %) of the liquid crystal compounds were calculated from the proportions of the peak areas.

The invention will be explained in details by way of the Examples described below, but is not limited by the same. The compounds in Comparative Examples and Examples are expressed using symbols according to the definitions in Table 3 below. In Table 3, the configuration of 1,4-cyclohexylene is trans. A parenthesized number next to a symbolized compound corresponds to the number of the compound. The symbol "-" means any other liquid crystal compound. The proportions (percentages) of the liquid crystal compounds are expressed in terms of weight percent (wt %) based on the total weight of the liquid crystal composition. The liquid crystal composition includes an impurity. The characteristic values of the composition were summarized in the last part.

TABLE 3

Method for Description of Compounds using Symbols
R—(A$_1$)—Z$_1$- - - - -Z$_n$—(A$_n$)—R'

| 1) Left-terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |
| $FC_nH_{2n}$— | Fn— |

| 2) Right-terminal Group —R' | Symbol |
|---|---|
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —$C_mH_{2m}$—CH=CH—$C_nH_{2n+1}$ | —mVn |

TABLE 3-continued

Method for Description of Compounds using Symbols
R—(A₁)—Z₁- - - - -Zₙ—(Aₙ)—R'

| | |
|---|---|
| —CH=CF₂ | —VFF |
| —OCH=CF₂ | —OVFF |
| —OCF=CF₂ | —OFVFF |
| —F | —F |
| —Cl | —CL |
| —OCF₃ | —OCF₃ |
| —CF₃ | —CF₃ |

3) Bonding Group —Zn— | Symbol

| | |
|---|---|
| —CₙH₂ₙ— | n |
| —CₙF₂ₙ— | Fn |
| —COO— | E |
| —CH=CH— | V |
| —CH₂O— | 1O |
| —OCH₂— | O1 |
| —CF₂O— | X |
| —C≡C— | T |

4) Ring Structure —Aₙ— | Symbol

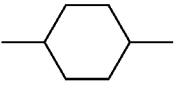  H

  B

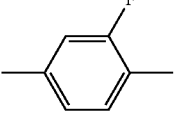  B(F)

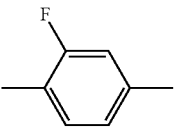  B(2F)

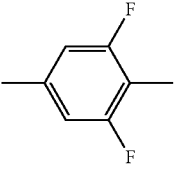  B(F,F)

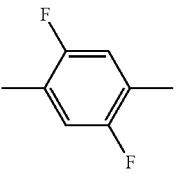  B(2F,5F)

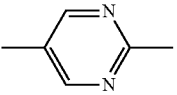  Py

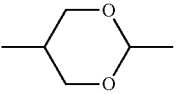  G

  dh

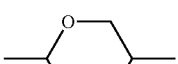  Dh

5) Examples of Description

Example 1  3-BB(F,F)XB(F,F)—OVFF

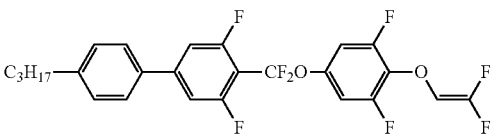

Example 2  3-HHXB(F,F)—OFVFF

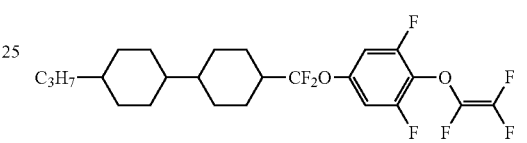

Example 3  3-BB(F)B(F,F)XB(F,F)—F

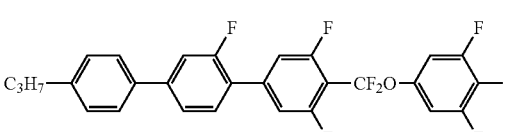

Example 4  V—HH-3

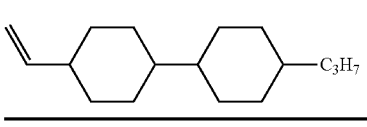

Example 1

| | | |
|---|---|---|
| 3-BB(F,F)XB(F,F)-OVFF | (1-3-1) | 6% |
| 3-BBXB(F,F)-F | (2-3-1) | 6% |
| 3-HHXB(F,F)-F | (2-7-1) | 10% |
| 3-BB(F)B(F,F)XB(F,F)-F | (2-10-1) | 8% |
| 4-BB(F)B(F,F)XB(F,F)-F | (2-10-1) | 5% |
| V-HH-3 | (3-1-1) | 35% |
| V-HHB-1 | (3-5-1) | 6% |
| 2-BB(F)B-3 | (3-7-1) | 3% |
| 2-BB(F)B-5 | (3-7-1) | 3% |
| 5-HBB(F)B-2 | (3-14-1) | 3% |
| 3-HBB(F,F)-F | (4-11-1) | 9% |
| 3-HHBB(F,F)-F | (4-15-1) | 3% |
| 5-HHBB(F,F)-F | (4-15-1) | 3% |

NI = 84.4° C.; Tc < −20° C.; Δn = 0.118; Δε = 8.3; Vth = 2.22 V; η = 15.6 mPa·s; γ1 = 110.2 mPa·s.

Comparative Example 1

A composition was formulated in which the compound of the first component of the invention was replaced by compound (2-2-1) being the second component in the composition in Example 1. The composition was prepared and measured by the method described above. The components and the characteristic values of the composition are described below.

| | | |
|---|---|---|
| 3-BB(F,F)XB(F,F)-F | (2-2-1) | 6% |
| 3-BBXB(F,F)-F | (2-3-1) | 6% |
| 3-HHXB(F,F)-F | (2-7-1) | 10% |
| 3-BB(F)B(F,F)XB(F,F)-F | (2-10-1) | 8% |
| 4-BB(F)B(F,F)XB(F,F)-F | (2-10-1) | 5% |
| V-HH-3 | (3-1-1) | 35% |
| V-HHB-1 | (3-5-1) | 6% |
| 2-BB(F)B-3 | (3-7-1) | 3% |
| 2-BB(F)B-5 | (3-7-1) | 3% |
| 5-HBB(F)B-2 | (3-14-1) | 3% |
| 3-HBB(F,F)-F | (4-11-1) | 9% |
| 3-HHBB(F,F)-F | (4-15-1) | 3% |
| 5-HHBB(F,F)-F | (4-15-1) | 3% |

NI = 83.3° C.; Tc < −20° C.; $\Delta n$ = 0.117; $\Delta \epsilon$ = 7.9; Vth = 2.23 V; $\eta$ = 16.1 mPa·s; $\gamma 1$ = 113.2 mPa·s.

The composition in Comparative Example 1 has a lower maximum temperature (NI) and a smaller dielectric anisotropy ($\Delta \epsilon$) in comparison with the composition in Example 1.

Comparative Example 2

Composition Example 19 was selected from the compositions disclosed in JP H10-204016 A. The reason was that the composition contains compound (1-5), compound (4-5-1), compound (4-11-1) and compound (4). Because the values of physical properties were not described, the composition was prepared and measured by the method described above. The components and the characteristic values of the composition are described below.

| | | |
|---|---|---|
| 5-HB(F)XB(F,F)-OVFF | (1-5) | 5% |
| 3-HHB(F,F)-F | (4-5-1) | 5% |
| 4-HHB(F,F)-F | (4-5-1) | 5% |
| 3-HBB(F,F)-F | (4-11-1) | 12% |
| 5-HBB(F,F)-F | (4-11-1) | 12% |
| 7-HB(F,F)-F | (4) | 3% |
| 3-H2B(F,F)-F | (4) | 12% |
| 4-H2B(F,F)-F | (4) | 10% |
| 3-HH2B(F,F)-F | (4) | 10% |
| 5-HH2B(F,F)-F | (4) | 10% |
| 3-BEBB(F)-OCF2CF2H | (—) | 5% |
| 3-B(F,F)XBB(F,F)-OCF2CF2CF3 | (—) | 5% |
| 3-HBXB(F,F)-F | (—) | 6% |

NI = 66.5° C.; Tc < −20° C.; $\Delta n$ = 0.094; $\Delta \epsilon$ = 7.8; Vth = 1.91 V; $\eta$ = 32.7 mPa·s.

Example 2

| | | |
|---|---|---|
| 3-BB(F,F)XB(F,F)-OVFF | (1-3-1) | 4% |
| 3-HHXB(F,F)-OVFF | (1-4-1) | 5% |
| 3-HBBXB(F,F)-OVFF | (1-9-1) | 4% |
| 3-BB(F,F)XB(F,F)-F | (2-2-1) | 6% |
| 3-BBXB(F,F)-F | (2-3-1) | 8% |
| 3-BB(F)B(F,F)XB(F,F)-F | (2-10-1) | 5% |
| 3-HBBXB(F,F)-F | (2-11-1) | 4% |
| 3-HH-4 | (3-1-1) | 30% |
| 3-HB-O2 | (3-2-1) | 10% |
| 5-B(F)BB-2 | (3-8-1) | 3% |
| 5-B(F)BB-3 | (3-8-1) | 3% |
| 5-HBBH-3 | (3-12-1) | 3% |
| 3-HHB(F,F)-F | (4-5-1) | 5% |
| 3-HBB(F,F)-F | (4-11-1) | 6% |
| 3-BB(F)B(F,F)-F | (4-12-1) | 4% |

NI = 75.5° C.; Tc < −20° C.; $\Delta n$ = 0.113; $\Delta \epsilon$ = 8.5; Vth = 1.99 V; $\eta$ = 15.2 mPa·s; $\gamma 1$ = 106.9 mPa·s.

Example 3

| | | |
|---|---|---|
| 3-HXB(F,F)-OVFF | (1-1-1) | 3% |
| 3-BB(F,F)XB(F,F)-OVFF | (1-3-1) | 5% |
| 3-HHXB(F,F)-OVFF | (1-4-1) | 4% |
| 3-HHXB(F,F)-OFVFF | (1-4-2) | 4% |
| 5-HXB(F,F)-F | (2-1-1) | 4% |
| 3-BB(F,F)XB(F,F)-F | (2-2-1) | 6% |
| 3-BB(F,F)XB(F)-OCF3 | (2-4-1) | 4% |
| 3-HHXB(F,F)-F | (2-7-1) | 5% |
| 3-HHXB(F)-OCF3 | (2-8-1) | 5% |
| 3-BB(F)B(F,F)XB(F,F)-F | (2-10-1) | 6% |
| 5-BB(F)B(F,F)XB(F)-F | (2-10-2) | 5% |
| 3-BB(F)B(F,F)XB(F)-OCF3 | (2-10-3) | 5% |
| 2-HH-3 | (3-1-1) | 5% |
| V-HH-3 | (3-1-1) | 19% |
| 1-BB-3 | (3-3-1) | 5% |
| 3-HHB-1 | (3-5-1) | 5% |
| 3-HHB-O1 | (3-5-1) | 5% |
| 3-HBB-2 | (3-6-1) | 5% |

NI = 71.1° C.; Tc < −20° C.; $\Delta n$ = 0.107; $\Delta \epsilon$ = 9.3; Vth = 1.81 V; $\eta$ = 16.0 mPa·s; $\gamma 1$ = 114.1 mPa·s.

Example 4

| | | |
|---|---|---|
| 5-B(F,F)XB(F,F)-OVFF | (1-2-1) | 4% |
| 3-BB(F,F)XB(F,F)-OVFF | (1-3-1) | 4% |
| 3-BB(F,F)XB(F,F)-OFVFF | (1-3-3) | 4% |
| 3-BB(F)B(F,F)XB(F,F)-OVFF | (1-8-1) | 4% |
| 3-BB(F,F)XB(F,F)-F | (2-2-1) | 4% |
| 3-BB(F)B(F,F)XB(F,F)-F | (2-10-1) | 5% |
| 3-HBB(F,F)XB(F,F)-F | (2-11-2) | 5% |
| 3-HB(F)B(F,F)XB(F,F)-F | (2-11-3) | 5% |
| V-HH-4 | (3-1-1) | 18% |
| V-HH-5 | (3-1-1) | 10% |
| 1V-HH-4 | (3-1-1) | 8% |
| V2-BB-1 | (3-3-1) | 5% |
| 3-HHEH-5 | (3-4-1) | 4% |
| 3-HHEBH-5 | (3-11-1) | 4% |
| 3-HB-CL | (4-1-1) | 5% |
| 3-HHB-CL | (4-4-1) | 5% |
| 3-HHEB(F,F)-F | (4-6-1) | 3% |
| 3-HBEB(F,F)-F | (4-9-1) | 3% |

NI = 70.6° C.; Tc < −20° C.; $\Delta n$ = 0.100; $\Delta \epsilon$ = 8.6; Vth = 1.89 V; $\eta$ = 14.7 mPa·s; $\gamma 1$ = 103.6 mPa·s.

Example 5

| | | |
|---|---|---|
| 3-BB(F,F)XB(F,F)-OVFF | (1-3-1) | 5% |
| 3-BBXB(F,F)-OVFF | (1-3-2) | 5% |
| 3-HB(F,F)XB(F,F)-OVFF | (1-5-1) | 5% |
| 3-HHBXB(F,F)-OVFF | (1-10-1) | 5% |
| 3-BB(F,F)XB(F,F)-F | (2-2-1) | 6% |
| 3-BBXB(F,F)-F | (2-3-1) | 4% |
| 3-BB(F)B(F,F)XB(F,F)-F | (2-10-1) | 8% |
| 3-HBBXB(F,F)-F | (2-11-1) | 6% |
| V-HH-3 | (3-1-1) | 20% |
| VFF-HH-3 | (3-1) | 5% |
| 7-HB-1 | (3-2-1) | 4% |
| 3-BB(2F,5F)B-3 | (3-9-1) | 4% |
| 3-HB(F)HH-5 | (3-10-1) | 5% |
| 1V2-BB-F | (4-2-1) | 3% |
| 1V2-BB-CL | (4-3-1) | 3% |
| 3-HBB-F | (4-10-1) | 6% |
| 3-BB(F)B(F,F)-F | (4-12-1) | 3% |
| 3-BB(F)B(F,F)-CF3 | (4-14-1) | 3% |

NI = 71.2° C.; Tc < −20° C.; $\Delta n$ = 0.127; $\Delta \epsilon$ = 11.3; Vth = 1.62 V; $\eta$ = 16.6 mPa·s; $\gamma 1$ = 117.0 mPa·s.

Example 6

| | | |
|---|---|---|
| 3-BB(F,F)XB(F,F)-OVFF | (1-3-1) | 3% |
| 3-dhB(F,F)XB(F,F)-OVFF | (1-6-1) | 3% |
| 3-BB(F)B(F,F)XB(F,F)-OVFF | (1-8-1) | 3% |
| 3-dhB(F)B(F,F)XB(F,F)-OVFF | (1-11-1) | 3% |
| 3-BB(F,F)XB(F,F)-F | (2-2-1) | 4% |
| 3-BB(F,F)XB(F)-F | (2-5-1) | 4% |
| 3-HHXB(F,F)-F | (2-7-1) | 4% |
| 3-HHXB(F,F)-CF3 | (2-9-1) | 3% |
| 3-BB(F)B(F,F)XB(F,F)-F | (2-10-1) | 4% |
| 3-BB(F,F)XB(F)B(F,F)-F | (2-13-1) | 4% |
| V-HH-3 | (3-1-1) | 22% |
| 1V2-HH-3 | (3-1-1) | 10% |
| 3-HB-O2 | (3-2-1) | 6% |
| 1V2-HHB-1 | (3-5-1) | 4% |
| VFF-HHB-1 | (3-5) | 4% |
| 1-BB(F)B-2V | (3-7-1) | 3% |
| 2-BB(F)B-2V | (3-7-1) | 3% |
| 3-HB(F)BH-3 | (3-13-1) | 3% |
| 3-HBB(F,F)-F | (4-11-1) | 4% |
| 3-HHBB(F,F)-F | (4-15-1) | 3% |
| 3-HHB(F)B(F,F)-F | (4-16-1) | 3% |

NI = 85.8° C.; Tc < −30° C.; Δn = 0.119; Δε = 9.2; Vth = 2.08 V; η = 17.0 mPa·s; γ1 = 119.6 mPa·s.

Example 7

| | | |
|---|---|---|
| 3-BB(F,F)XB(F,F)-OVFF | (1-3-1) | 4% |
| 3-GB(F,F)XB(F,F)-OVFF | (1-7-1) | 4% |
| 3-BB(F)B(F,F)XB(F,F)-OVFF | (1-8-1) | 3% |
| 3-GB(F)B(F,F)XB(F,F)-OVFF | (1-12-1) | 3% |
| 3-BB(F,F)XB(F,F)-F | (2-2-1) | 5% |
| 3-GB(F,F)XB(F,F)-F | (2-6-1) | 4% |
| 3-BB(F)B(F,F)XB(F,F)-F | (2-10-1) | 5% |
| 3-GB(F)B(F,F)XB(F,F)-F | (2-12-1) | 4% |
| V-HH-3 | (3-1-1) | 28% |
| 1V-HH-3 | (3-1-1) | 7% |
| V-HHB-1 | (3-5-1) | 5% |
| V2-HHB-1 | (3-5-1) | 4% |
| V2-B(F)BB-2 | (3-8-1) | 5% |
| 2-B(F)BB-2V | (3-8-1) | 5% |
| 3-HGB(F,F)-F | (4-7-1) | 4% |
| 3-GHB(F,F)-F | (4-8-1) | 4% |
| 3-PyBB-F | (4) | 3% |
| 1O1-HBBH-5 | (—) | 3% |

NI = 82.0° C.; Tc < −30° C.; Δn = 0.119; Δε = 11.0; Vth = 1.87 V; η = 15.8 mPa·s; γ1 = 111.1 mPa·s.

Example 8

| | | |
|---|---|---|
| 3-BB(F,F)XB(F,F)-OVFF | (1-3-1) | 3% |
| 3-HB(F,F)XB(F,F)-OVFF | (1-5-1) | 3% |
| 3-BB(F)B(F,F)XB(F,F)-OVFF | (1-8-1) | 3% |
| 3-HHB(F,F)XB(F,F)-OVFF | (1-10-2) | 3% |
| 3-BB(F,F)XB(F)B(F,F)-OVFF | (1-13-1) | 3% |
| 3-BB(F,F)XB(F,F)-F | (2-2-1) | 5% |
| 1-HHXB(F,F)-F | (2-7-1) | 3% |
| 3-HHXB(F,F)-CF3 | (2-9-1) | 4% |
| 3-BB(F)B(F,F)XB(F,F)-F | (2-10-1) | 4% |
| 3-HB(F)B(F,F)XB(F,F)-F | (2-11-3) | 4% |
| 3-HH-4 | (3-1-1) | 26% |
| 2-HH-5 | (3-1-1) | 10% |
| 3-HHB-1 | (3-5-1) | 4% |
| 3-HHB-3 | (3-5-1) | 4% |
| 2-BB(F)B-3 | (3-7-1) | 4% |
| 2-BB(F)B-5 | (3-7-1) | 4% |
| 3-HBB(F,F)-F | (4-11-1) | 4% |
| 3-BB(F)B(F,F)-F | (4-12-1) | 3% |
| 3-BB(F,F)B-F | (4-13-1) | 3% |
| 3-HHBB(F,F)-F | (4-15-1) | 3% |

NI = 81.6° C.; Tc < −30° C.; Δn = 0.114; Δε = 9.5; Vth = 2.00 V; η = 19.4 mPa·s; γ1 = 136.0 mPa·s.

The compositions in Example 1 to Example 8 have a larger dielectric anisotropy in comparison with the compositions in Comparative Example 1 and Comparative Example 2. Accordingly, the liquid crystal composition of the invention has superb characteristics.

INDUSTRIAL APPLICABILITY

The invention concerns a liquid crystal composition satisfying at least one of characteristics such as a high maximum temperature of nematic phase, a low minimum temperature of nematic phase, a small viscosity, a suitable optical anisotropy, a large dielectric anisotropy, a large specific resistance, a large elastic constant, a high stability to UV light and a high stability to heat, or a liquid crystal composition having a suitable balance regarding at least two of the characteristics. A liquid crystal display device including such a composition is applied to constitute an AM device having a short response time, a large voltage holding ratio, a large contrast ratio, a long service life and so forth, and thus can be used for a liquid crystal projector, a liquid crystal television and so forth.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

What is claimed is:

1. A liquid crystal composition that has a positive dielectric anisotropy, and contains at least one compound selected from the group of compounds represented by formula (1) as a first component and at least one compound selected from the group of compounds represented by formula (2) as a second component:

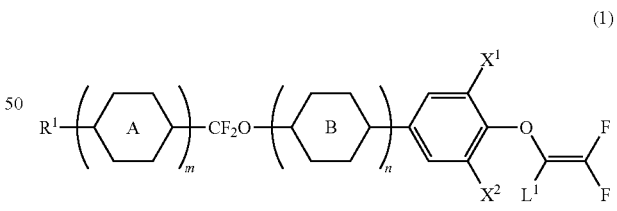

(1)

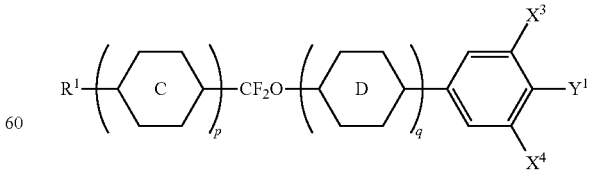

(2)

wherein $R^1$ and $R^2$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine; ring A, ring B, ring C and ring D are independently 1,4-cyclohexylene, 1,4-phenylene, 3-fluoro-1,4-phenylene, 3,5-difluoro-1,4-phenylene, pyrimidine-2,5-diyl, 1,3-dioxane-2,5-diyl or tetrahydropyran-2,5-diyl; $X^1$, $X^2$, $X^3$ and $X^4$ are independently fluorine or chlorine; $L^1$ is hydrogen or fluorine; $Y^1$ is fluorine, chlorine, trifluoromethyl or trifluoromethoxy; m and p are independently 1, 2, or 3, n and q are independently 0, 1 or 2, a sum of m and n and a sum of p and q are 3 or less, and when one of two rings C in a case where p is 2 is 1,4-cyclohexylene, the other is not 1,4-phenylene.

2. The liquid crystal composition according to claim 1, wherein the first component comprises at least one compound selected from the group of compounds represented by formulae (1-1) to (1-13):

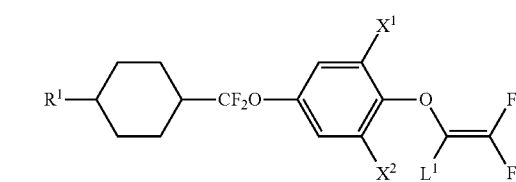
(1-1)

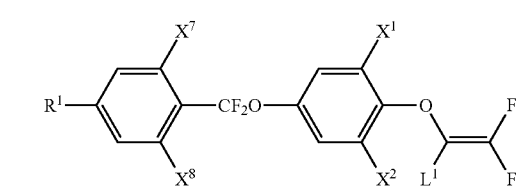
(1-2)

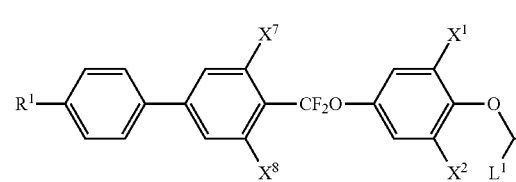
(1-3)

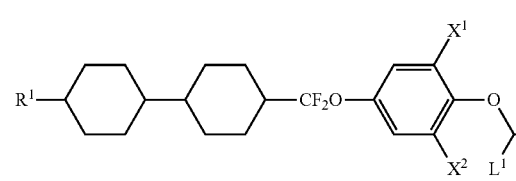
(1-4)

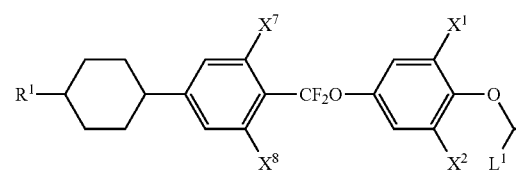
(1-5)

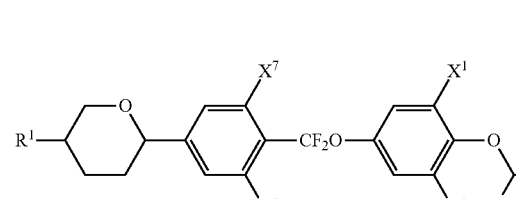
(1-6)

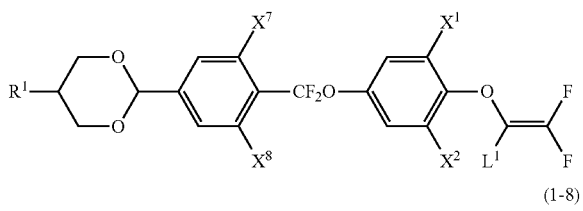
(1-7)

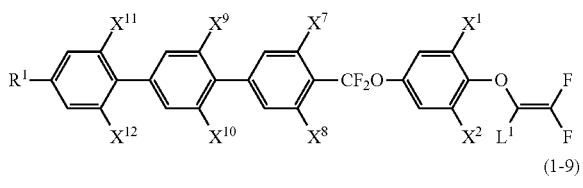
(1-8)

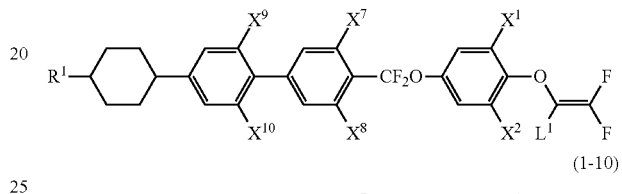
(1-9)

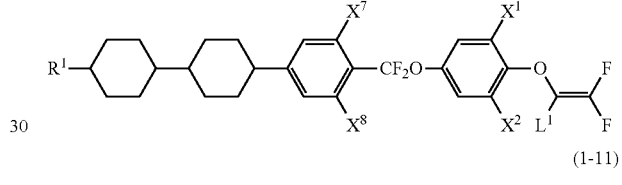
(1-10)

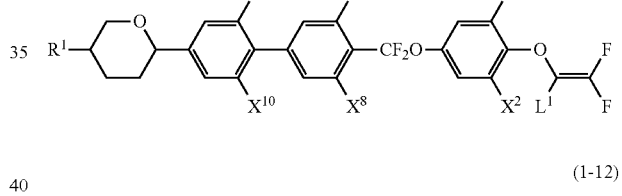
(1-11)

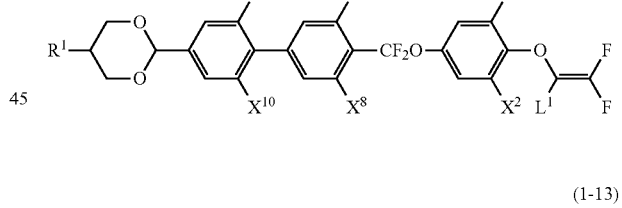
(1-12)

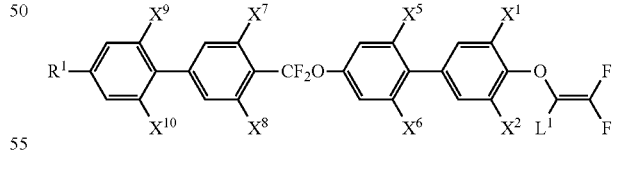
(1-13)

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine, $X^1$, $X^2$, $X^5$, $X^6$, $X^7$, $X^8$, $X^9$, $X^{10}$, $X^{11}$ and $X^{12}$ are independently hydrogen or fluorine, and $L^1$ is hydrogen or fluorine.

3. The liquid crystal composition according to claim 1, wherein the second component comprises at least one compound selected from the group of compounds represented by formulae (2-1) to (2-13):

(2-1) 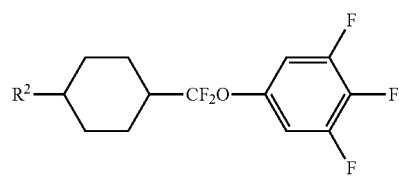

(2-2) 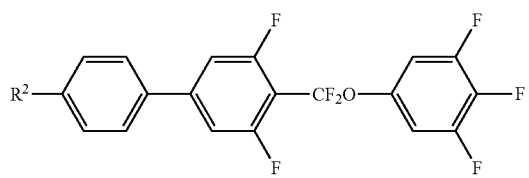

(2-3) 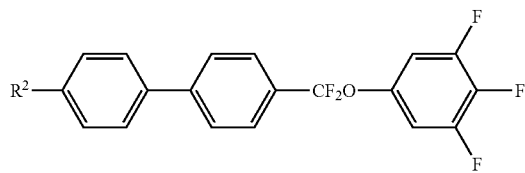

(2-4) 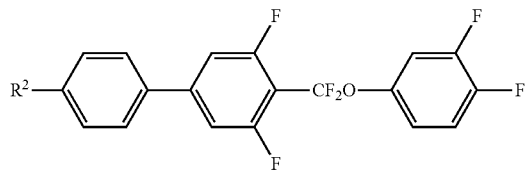

(2-5) 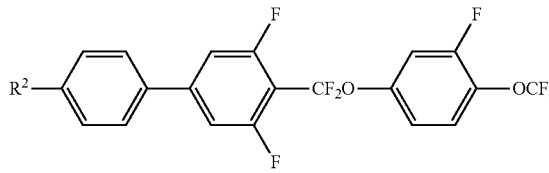

(2-6) 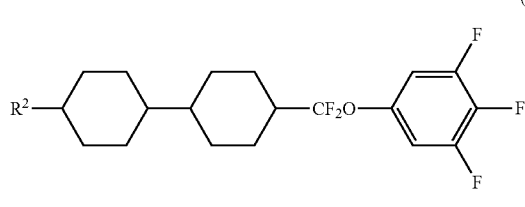

(2-7) 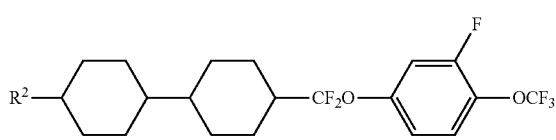

(2-8) 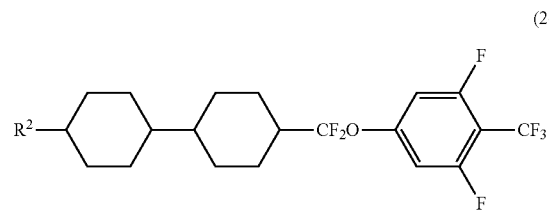

(2-9) 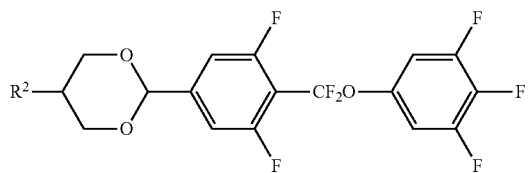

(2-10) 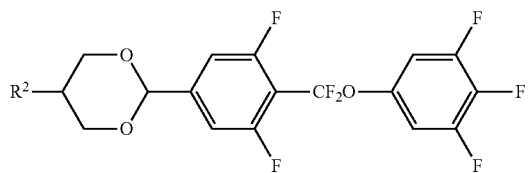

(2-11) 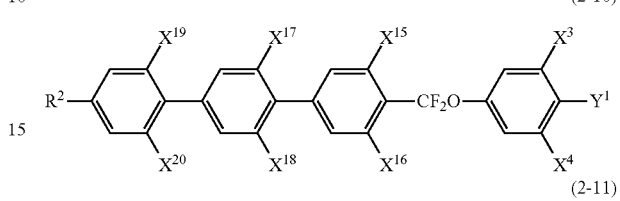

(2-12) 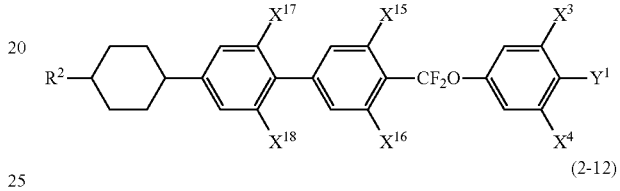

(2-13) 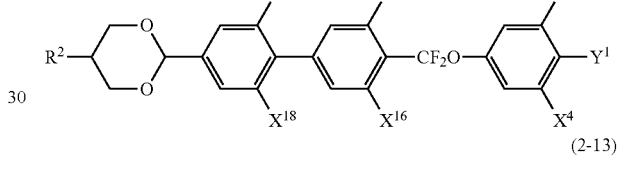

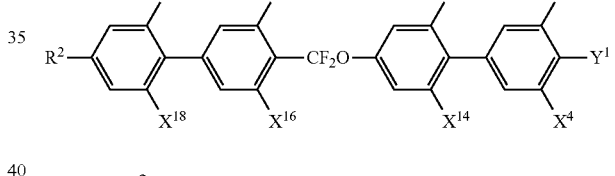

wherein $R^2$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $X^3$, $X^4$, $X^{13}$, $X^{14}$, $X^{15}$, $X^{16}$, $X^{17}$, $X^{18}$, $X^{19}$ and $X^{20}$ are independently hydrogen or fluorine; and $Y^1$ is fluorine, chlorine, trifluoromethyl or trifluoromethoxy.

4. The liquid crystal composition according to claim 1, wherein a proportion of the first component is in a range of 3 wt % to 40 wt %, and a proportion of the second component is in a range of 5 wt % to 60 wt %, based on the total weight of the liquid crystal composition.

5. The liquid crystal composition according to claim 1, further containing at least one compound selected from the group of compounds represented by formula (3) as a third component:

(3) 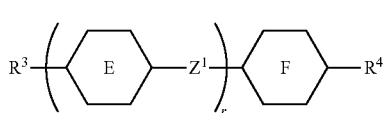

wherein $R^3$ and $R^4$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring E and ring F are independently 1,4-cyclohexylene, 1,4-phenylene, 2-fluoro-1,4-phenylene, 3-fluoro-1,4-phenylene or 2,5-difluoro-1,4-phenylene; $Z^1$ is a single bond, ethylene or carbonyloxy; and r is 1, 2 or 3.

6. The liquid crystal composition according to claim 5, wherein the third component comprises at least one compound selected from the group of compounds represented by formulae (3-1) to (3-13):

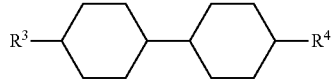
(3-1)

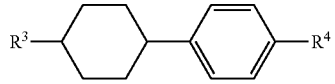
(3-2)

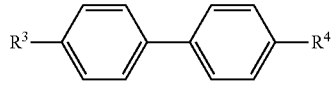
(3-3)

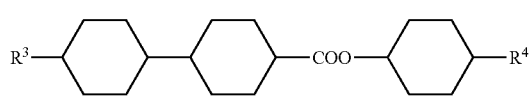
(3-4)

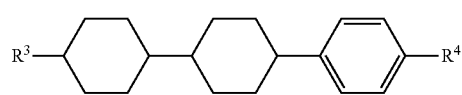
(3-5)

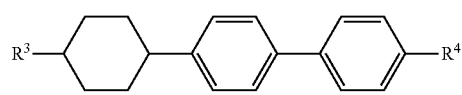
(3-6)

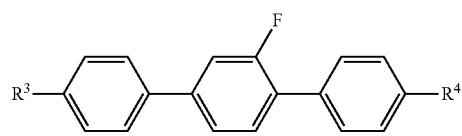
(3-7)

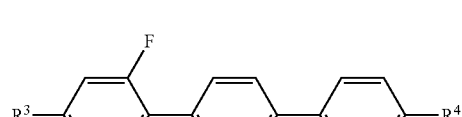
(3-8)

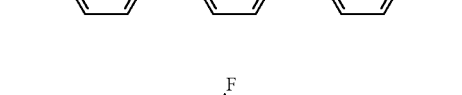
(3-9)

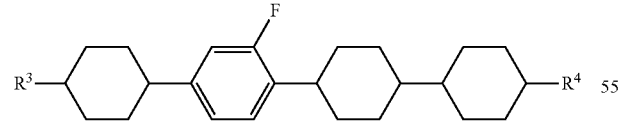
(3-10)

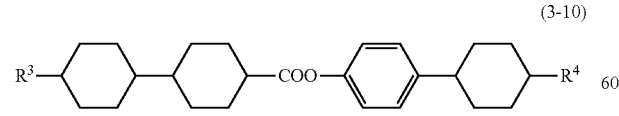
(3-11)

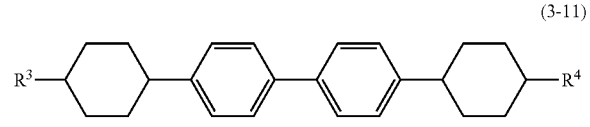
(3-12)

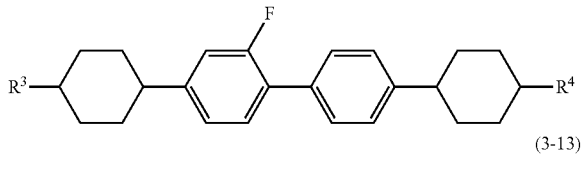
(3-13)

wherein, $R^3$ and $R^4$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

7. The liquid crystal composition according to claim 5, wherein a proportion of the third component is in a range of 25 wt % to 65 wt % based on a total weight of the liquid crystal composition.

8. The liquid crystal composition according to claim 1, further containing at least one compound selected from the group of compounds represented by formula (4) as a fourth component:

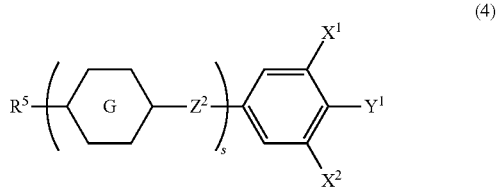
(4)

wherein $R^5$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring G is 1,4-cyclohexylene, 1,3-dioxane-2,5-diyl, 1,4-phenylene, 3-fluoro-1,4-phenylene, 3,5-difluoro-1,4-phenylene, 1,3-dioxane-2,5-diyl, tetrahydropyran-2,5-diyl or pyrimidine-2,5-diyl; $Z^2$ is a single bond, ethylene or carbonyloxy; $X^1$ and $X^2$ are independently hydrogen or fluorine; $Y^1$ is fluorine, chlorine, trifluoromethyl or trifluoromethoxy; and s is 1, 2, or 3.

9. The liquid crystal composition according to claim 5, further containing at least one compound selected from the group of compounds represented by formula (4) as a fourth component:

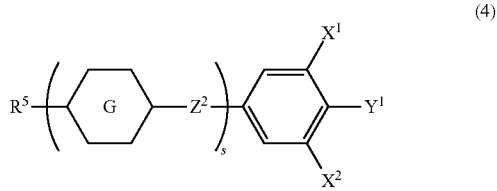
(4)

wherein $R^5$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring G is 1,4-cyclohexylene, 1,3-dioxane-2,5-diyl, 1,4-phenylene, 3-fluoro-1,4-phenylene, 3,5-difluoro-1,4-phenylene, 1,3-dioxane-2,5-diyl, tetrahydropyran-2,5-diyl or pyrimidine-2,5-diyl; $Z^2$ is a single bond, ethylene or carbonyloxy; $X^1$ and $X^2$ are independently hydrogen or fluorine; $Y^1$ is fluorine, chlorine, trifluoromethyl or trifluoromethoxy; and s is 1, 2, or 3.

10. The liquid crystal composition according to claim 8, wherein the fourth component comprises at least one compound selected from the group of compounds represented by formulae (4-1) to (4-16):

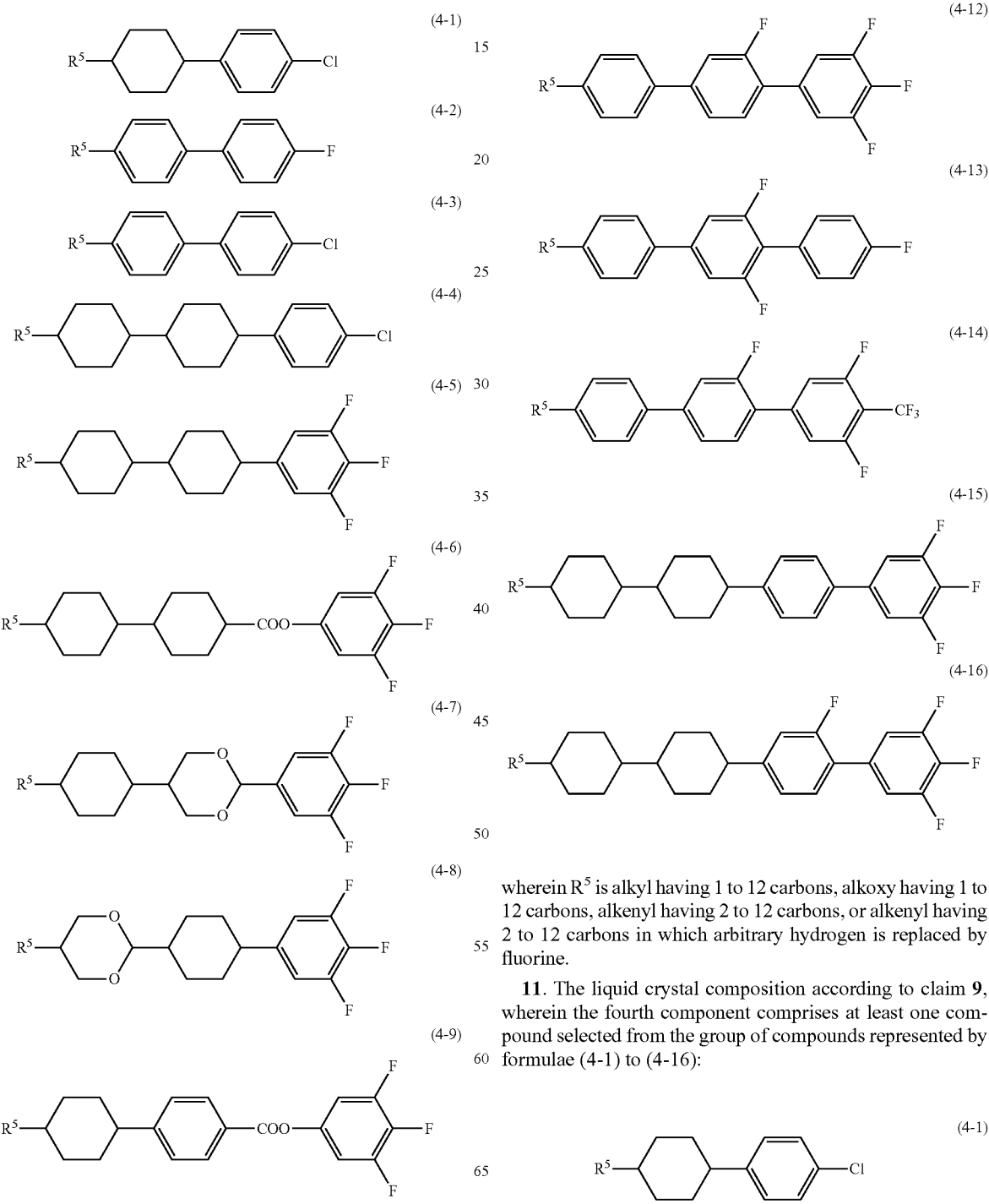

wherein $R^5$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

11. The liquid crystal composition according to claim 9, wherein the fourth component comprises at least one compound selected from the group of compounds represented by formulae (4-1) to (4-16):

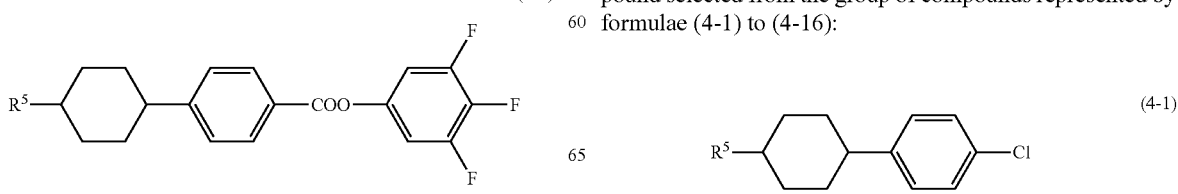

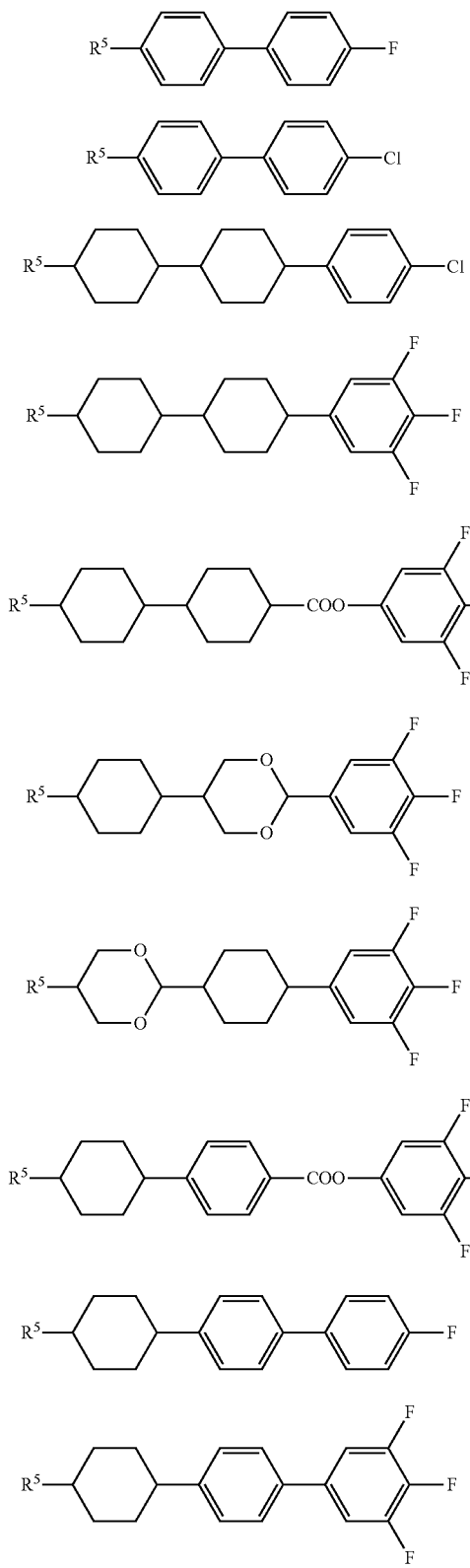
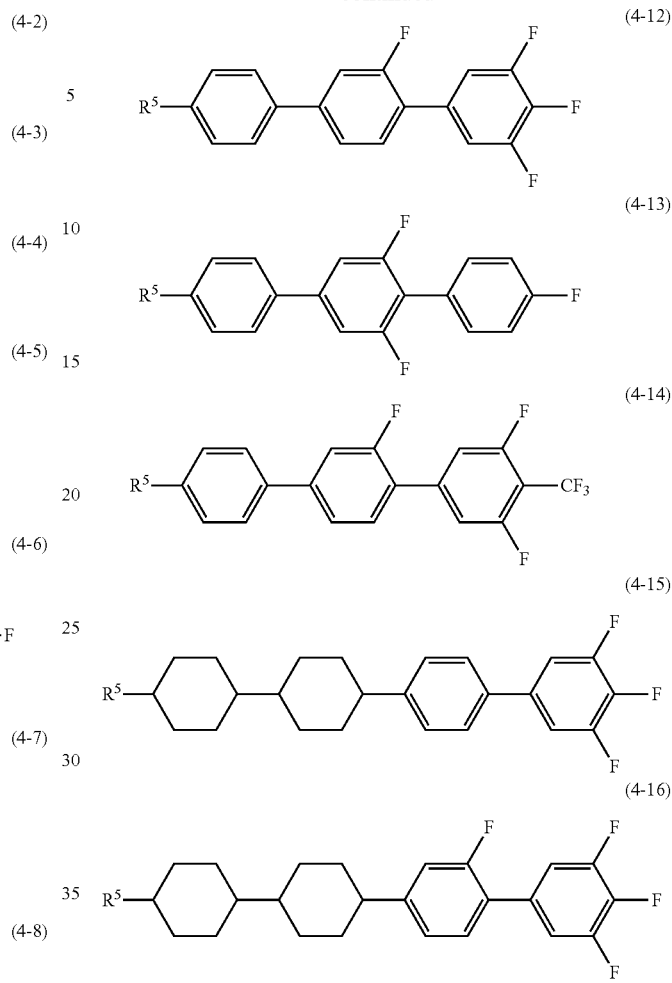

wherein $R^5$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

12. The liquid crystal composition according to claim 8, wherein a proportion of the fourth component is in a range of 3 wt % to 30 wt % based on a total weight of the liquid crystal composition.

13. The liquid crystal composition according to claim 9, wherein a proportion of the fourth component is in a range of 3 wt % to 30 wt % based on a total weight of the liquid crystal composition.

14. The liquid crystal composition according to claim 1, of which a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is 2 or more.

15. A liquid crystal display device including the liquid crystal composition according to claim 1.

16. The liquid crystal display device according to claim 15, of which an operating mode is a TN mode, an ECB mode, an OCB mode, an IPS mode, a PSA mode or an FPA mode, and a driving mode is an active matrix mode.

* * * * *